(12) United States Patent
Chandramouli et al.

(10) Patent No.: US 10,178,161 B2
(45) Date of Patent: Jan. 8, 2019

(54) DIGITAL SIGNAL PROCESSING OVER DATA STREAMS

(71) Applicant: Microsoft Technology Licensing, LLC, Redmond, WA (US)

(72) Inventors: Badrish Chandramouli, Redmond, WA (US); Jonathan D. Goldstein, Woodinville, WA (US); Milos Nikolic, Crissier (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 420 days.

(21) Appl. No.: 15/152,369

(22) Filed: May 11, 2016

(65) Prior Publication Data

US 2017/0331881 A1 Nov. 16, 2017

(51) Int. Cl.
*G06F 15/16* (2006.01)
*H04L 29/08* (2006.01)
(Continued)

(52) U.S. Cl.
CPC ........ *H04L 67/10* (2013.01); *G06F 17/30442* (2013.01); *H04L 47/82* (2013.01); *H04L 49/9042* (2013.01); *H04L 67/12* (2013.01)

(58) Field of Classification Search
CPC ..... H04L 67/10; H04L 47/82; H04L 49/9042; H04L 67/12; G06F 17/30442;
(Continued)

(56) References Cited

U.S. PATENT DOCUMENTS 6,446,136 B1 9/2002 Pohlmann et al.
7,996,388 B2 8/2011 Jain et al.
(Continued)

FOREIGN PATENT DOCUMENTS

WO  WO2011162628 A2  12/2011

OTHER PUBLICATIONS

Office action for U.S. Appl. No. 14/109,643, dated Dec. 22, 2016, Chandramouli et al., "Analytical Data Processing Engine", 27 pages.

(Continued)

*Primary Examiner* — Oleg Survillo
*Assistant Examiner* — Tan Doan
(74) *Attorney, Agent, or Firm* — Schwegman Lundberg & Woessner, P.A.

(57) ABSTRACT

The techniques and systems described herein are directed to providing deep integration of digital signal processing (DSP) operations with a general-purpose query processor. The techniques and systems provide a unified query language for processing tempo-relational and signal data, provide mechanisms for defining DSP operators, and support incremental computation in both offline and online analysis. The techniques and systems include receiving streaming data, aggregating and performing uniformity processing to generate a uniform signal, and storing the uniform signal in a batched columnar representation. Data can be copied from the batched columnar representation to a circular buffer, where DSP operations are applied to the data. Incremental processing can avoid redundant processing. Improvements to the functioning of a computer are provided by reducing an amount of data that to be passed back and forth between separate query databases and DSP processors, and by reducing a latency of processing and/or memory usage.

20 Claims, 10 Drawing Sheets

(51) Int. Cl.
    H04L 12/911    (2013.01)
    H04L 12/861    (2013.01)
    G06F 17/30     (2006.01)
(58) Field of Classification Search
    CPC ........ G06F 17/30516; G06F 7/00; G06F 9/46;
                 G06F 17/156; H03H 17/0213; H03H
                 17/06
    USPC ........................................................ 709/217
    See application file for complete search history.

(56)                References Cited

U.S. PATENT DOCUMENTS 8,478,743  B2     7/2013   Chandramouli et al.
    8,484,243  B2     7/2013   Krishnamurthy et al.
    8,694,565  B2     4/2014   Beckman et al.
    8,990,416  B2     3/2015   Shukla et al.
 2005/0235113  A1*   10/2005   Smirnov ................ G11B 20/10
                                                           711/118
 2009/0125635  A1     5/2009   Barga et al.
 2009/0171890  A1     7/2009   Johnson et al.
 2011/0231389  A1     9/2011   Surna et al.
 2011/0282812  A1    11/2011   Chandramouli et al.
 2012/0166417  A1     6/2012   Chandramouli et al.
 2012/0324453  A1*   12/2012   Chandramouli .. G06F 17/30516
                                                           718/100
 2013/0031567  A1     1/2013   Nano et al.
 2013/0066924  A1     3/2013   Iyer et al.
 2013/0159969  A1     6/2013   Meijer et al.
 2013/0204896  A1     8/2013   Jimenez Peris et al.
 2013/0254771  A1     9/2013   Musayev et al.
 2014/0095447  A1     4/2014   Deshmukh et al.
 2014/0372438  A1    12/2014   Chandramouli et al.
 2015/0073967  A1     3/2015   Katsuyama et al.
 2015/0169683  A1     6/2015   Chandramouli et al.
 2016/0004751  A1     1/2016   Lafuente Alvarez et al.

OTHER PUBLICATIONS

Lander, et al., "Appion: an integrated, database-driven pipeline to facilitate EM image processing", In Journal of structural biology vol. 166, No. 1, Apr. 2009, pp. 1-16.
Zhou, et al., "Unifying the Processing of XML Streams and Relational Data Streams", In Proceedings of the 22nd International Conference on Data Engineering, Apr. 3, 2006, pp. 1-12.
"Process streaming signals and large data with System objects", Retrieved on: Mar. 29, 2016 Available at: http://in.mathworks.com/discovery/stream-processing.html?requestedDomain=www.mathworks.com, 4 pgs.
Anicic, et al., "EP-SPARQL: A Unified Language for Event Processing and Stream Reasoning", In Proceedings of the 20th international conference on World wide web, Mar. 28, 2011, pp. 635-644.
"Unified Query for Big Data Management Systems", In Oracle White Paper, Mar. 2016, 11 pages.
Platt, et al., "The Trill Incremental Analytics Engine", In Microsoft Research Technical Report MSR-TR-2014-54, Apr. 2014, 14 pages.
Chandramouli, et al., "Trill: A high-performance incremental query processor for diverse analytics", In Proceedings of the VLDB Endowment, vol. 8 Issue 4, Dec. 2004, pp. 401-412.
Katsis, et al., "Combining Databases and Signal Processing in Plato", In Proceedings of Seventh Biennial Conference on Innovative Data Systems Research, Jan. 4, 2015, 9 pages.
Stonebraker, et al., "Requirements for Science Data Bases and SciDB", In Proceedings of Fourth Biennial Conference on Innovative Data Systems Research, Jan. 4, 2009, 9 pages.
Brown, Paul G., "Overview of sciDB: Large scale array storage, processing and analysis", In Proceedings of ACM SIGMOD International Conference on Management of data, Jun. 6, 2010, pp. 963-968.
Smith, Steven W., "The Scientist & Engineer's Guide to Digital Signal Processing", Chapt 4, In Publication of California Technical Publishing, Apr. 5, 2016, 20 pgs.
Jensen, et al., "Temporal specialization", In Proceedings of the Eighth International Conference on Data Engineering, Feb. 3, 1992, pp. 594-603.
Barga, et al. "Consistent streaming through time: A Vision for Event Stream Processing", In Proceedings of 3rd Biennial Conference on Innovative Data Systems Research, Jan. 7, 2007, pp. 363-374.
Hammad, et al., "Nile: A Query Processing Engine for Data Streams", In Proceedings of 20th International Conference on Data Engineering, Mar. 30, 2004, 1 page.
Maier, et al., "Semantics of data streams and operators", In Proceedings of the 10th international conference on Database Theory, Jan. 5, 2005, pp. 37-52.
"Expression Trees", Retrieved on: Apr. 5, 2016 Available at: https://msdn.microsoft.com/en-us/enus/library/bb397951.aspx.
"LINQ (Language-Integrated Query)", Retrieved on: Apr. 5, 2016 Available at: http://tinyurl.com/42egdn, 4 pgs.
Zaharia, et al., "Resilient Distributed Datasets: A Faulttolerant Abstraction for In-memory Cluster Computing", In Proceedings of the 9th USENIX conference on Networked Systems Design and Implementation, Apr. 25, 2012, 14 pages.
"Run R programs within SciDB queries", Retrieved on: Apr. 5, 2016 Available at: https://github.com/Paradigm4/r_exec, 2 pgs.
Girod, et al., "The Case for a Signal-Oriented Data Stream Management System", In Proceedings of 3rd Biennial Conference on Innovative Data Systems Research, Jan. 7, 2007, 10 pages.
Girod, et al., "XStream: A Signal-oriented Data Stream Management System", In Proceedings of IEEE 24th International Conference on Data Engineering, Apr. 7, 2008, pp. 1180-1189.
"Signal Processing Toolbox", Retrieved on: Apr. 5, 2016 Available at: http://www.mathworks.com/products/signal, 2 pgs.
"LabVIEW System Design Software", Retrieved on: Apr. 5, 2016 Available at: http://www.ni.com/labview, 3 pgs.
"StreamBase", Retrieved on: Apr. 5, 2016 Available at: http://www.streambase.com/, 2 pgs.
Boncz, et al., "MonetDB/XQuery: A Fast XQuery Processor Powered by a Relational Engine", In Proceedings of the 2006 ACM SIGMOD international conference on Management of data, Jun. 27, 2006, pp. 479-490.
Cranor, et al., "Gigascope: A Stream Database for Network applications", In Proceedings of the ACM SIGMOD International conference on Management of data, Jun. 9, 2003, pp. 647-651.
Sullivan, et al., "Tribeca: A System for Managing Large Databases of Network Traffic", In Proceedings of the USENIX Annual Technical Conference, Jun. 1998, 13 pages.
Arasu, et al., "Stream: The Stanford Data Stream Management System", In Technical Report, Mar. 2004, pp. 1-21.
Chandrasekaran, et al., "TelegraphCQ: continuous dataflow processing", In Proceedings of the ACM SIGMOD International conference on Management of data, Jun. 9, 2003, pp. 668.
Abadi, et al., "The Design of the Borealis Stream Processing Engine", In Proceedings of Second Biennial Conference on Innovative Data Systems Research, Jan. 2005, 13 pages.
"SQL Server R Services", Retrieved on: Apr. 5, 2016 Available at: https://msdn.microsoft.com/en-us/enus/library/mt604845.aspx, 2 pgs.
Ali, et al., "The Extensibility Framework in Microsoft StreamInsight", In Proceedings of the IEEE 27th International Conference on Data Engineering, Apr. 11, 2011, 12 pages.
Madden, et al., "TinyDB: An Acquisitional Query Processing System for Sensor Networks", In Journal of ACM Transactions on Database Systems, vol. 30, Issue 1, Mar. 2005, pp. 1-47.
Bonnet, et al., "Towards Sensor Database Systems", In Proceedings of the Second International Conference on Mobile Data Management, Jan. 8, 2001, 12 pages.
Chong, et al., "Sensor Networks: Evolution, Opportunities, and Challenges", In Proceedings of the IEEE, vol. 91, Issue 8, Aug. 2003, pp. 1247-1256.
Gedik, et al., "SPADE: The System S Declarative Stream Processing Engine", In Proceedings of the ACM SIGMOD International conference on Management of data, Jun. 9, 2008, pp. 1123-1134.

(56) References Cited

OTHER PUBLICATIONS

"International Search Report and Written Opinion Issued in PCT Application No. PCT/US2017/031178", dated Jul. 6, 2017, 11 Pages.
Win, et al., "A Stream Merge Method to Reduce Load for Sensor Data Stream Delivery", In Proceedings of the IEEE 4th Global Conference on Consumer Electronics, Oct. 27, 2015, pp. 120-121.
Office action for U.S. Appl. No. 14/109,643, dated Aug. 18, 2016, Chandramouli et al., "Analytical Data Processing Engine", 21 pages.
Akidau, et al, "MillWheel: Fault-Tolerant Stream Processing at Internet Scale", In Proceedings of the VLDB Endowment, vol. 6, Issue 11, Aug. 2013, pp. 1033-1044.
Akidau, et al., "The Dataflow Model: A Practical Approach to Balancing Correctness, Latency, and Cost in Massive-Scale, Unbounded, Out-of-Order Data Processing", In Proceedings of the VLDB Endowment, vol. 8, Issue 12, Aug. 2015, pp. 1792-1803.
Alexandrov, et al., "The Stratosphere Platform for Big Data Analytics", In International Journal on Very Large Data Bases, vol. 23, Issue 6, Dec. 2014, pp. 939-964.
Ali, et al., "Spatio-Temporal Stream Processing in Microsoft StreamInsight", In Proceedings of IEEE Data Engineering Bulletin, vol. 33, No. 2, Jun. 2010, pp. 1-6.
"Apache Hadoop NextGen MapReduce (YARN)", Retrieved on: Jan. 12, 2016 Available at: http://hadoop.apache.org/docs/current/hadoop-yarn/hadoop-yarn-site/YARN.html, 2 pages.
"Apache Storm", Retrieved on: Jan. 12, 2016; Available at: http://storm.apache.org/, 4 pages.
Armbrust, Michael Paul, "Scale-Independent Relational Query Processing", In Technical Report No. UCB/EECS-2013-165, Oct. 4, 2013, 144 pages.
Armbrust, et al., "Spark SQL: Relational Data Processing in Spark", In Proceedings of the ACM SIGMOD International Conference on Management of Data, May 31, 2015, pp. 1383-1394.
Babcock, et al., "Models and Issues in Data Stream Systems", In Proceedings of the twenty-first ACM SIGMOD-SIGACT-SIGART symposium on Principles of database systems, Jun. 3, 2002, pp. 1-16.
Badrish, et al., "Scalable Progressive Analytics on Big Data in the Cloud" In Proceedings of the VLDB Endowment, vol. 6, No. 14, Aug. 26, 2013, 12 pages.
Barnett, et al.,"Stat! —An Interactive Analytics Environment for Big Data" In Proceedings of the ACM SIGMOD International Conference on Management of Data, Jun. 22, 2013, 4 pages.
Barnett, et al., "Stat! An Interactive Analytics Environment for Big Data", In Proceedings of ACM SIGMOD International Conference on Management of Data, Jun. 22, 2013, pp. 1013-1016.
"BigQuery", Retrieved on: Jan. 12, 2016; Available at: https://cloud.google.com/bigquery/, 4 pages.
Chambers, et al., "FlumeJava: Easy, Efficient Data-Parallel Pipelines", In Proceedings of the 31st ACM SIGPLAN Conference on Programming Language Design and Implementation, Jun. 5, 2010, pp. 363-375.
Chandramouli, et al., "Scalable Progressive Analytics on Big Data in the Cloud", In Proceedings of International Conference on Very Large Data Bases, vol. 6, Issue 14, Aug. 26, 2013, pp. 1726-1737.
Chandramouli, et al., "Temporal Analytics on Big Data for Web Advertising" In Proceedings of the 2012 IEEE 28th International Conference on Data Engineering, Apr. 1, 2012, 12 pages.
"Column Store Features", Published on: May 9, 2011, Available at: http://www.monetdb.org/Home/Features.
Dean, et al., "MapReduce: Simplified Data Processing on Large Clusters", In Journal of Communications of the ACM Magazine, vol. 51, Issue 1, Jan. 2008, pp. 107-113.
Fernandez, et al., "Integrating Scale Out and Fault Tolerance in Stream Processing using Operator State Management", In Proceedings of ACM SIGMOD International Conference on Management of Data, Jun. 22, 2013, pp. 725-736.
"GitHub Archive", Retrieved on: Jan. 12, 2016; Available at: https://www.githubarchive.org/, 3 pages.
Grover, et al., "SQL-like Big Data Environments: Case Study in Clinical Trial Analytics", In Proceedings of IEEE International Congress on Big Data, Oct. 29, 2015, pp. 2680-2689.
Gulisano, et al., "StreamCloud: A Large Scale Data Streaming System" In Proceedings of International Conference on Distributed Computing System, Jun. 21, 2010, 12 pages.
Gupta, et al., "Amazon Redshift and the Case for Simpler Data Warehouses", In Proceedings of ACM SIGMOD International Conference on Management of Data, May 31, 2015, pp. 1917-1923.
Hilley, et al., "Persistent Temporal Streams" In Proceedings of the 10th ACM/IFIP/USENIX International Conference on Middleware, Nov. 30, 2009, 20 pages.
Hugg, John, "Lambda Complexity: Why Fast Data Needs New Thinking", Published on: Mar. 17, 2015 Available at: https://voltdb.com/blog/lambda-complexity-why-fast-data-needs-new-thinking, 14 pages.
"In-Stream Big Data Processing", Published on: Aug. 20, 2013, Available at: http://highlyscalable.wordpress.com/2013/08/20/in-stream-big-data-processing/#comments, 23 pages.
Isard, et al., "Dryad: Distributed Data-Parallel Programs from Sequential Building Blocks", In Proceedings of 2nd ACM SIGOPS/EuroSys European Conference on Computer Systems, Mar. 21, 2007, pp. 59-72.
Jensen, et al., "Temporal Data Management", In Journal of IEEE Transactions on Knowledge and Data Engineering, vol. 11, Issue 1, Jan. 1999, pp. 36-44.
Kornacker, et al., "Impala: A Modern, Open-Source SQL Engine for Hadoop", In Proceedings of 7th Biennial Conference on Innovative Data Systems Research, Jan. 4, 2015, 10 pages.
Leetaru, Kalev H., "World's Largest Event Dataset Now Publicly Available in BigQuery", Published on: May 29, 2014, Available at: http://googlecloudplatform.blogspot.in/2014/05/worlds-largest-event-dataset-now-publicly-available-in-google-bigquery.html; 5 pages.
Li, et al., "No Pane, No Gain: Efficient Evaluation of Sliding-Window Aggregates over Data Streams", In Journal of ACM SIGMOD Record, vol. 34, Issue 1, Mar. 2005, pp. 39-44.
Liarou, et al., "A Column-Oriented Data Stream Engine", Retrieved on: Oct. 17, 2013, Available at:http://citeseerxist.psu.edu/viewdoc/downloaddoi=10.1.1.108.9843& rep=rep1&type=pdf, 9 pages.
Marz, Nathan, "How to beat the CAP Theorem", Published on: Oct. 13, 2011 Available at: http://nathanmarz.com/blog/how-to-beat-the-cap-theorem.html, 10 pages.
"Microsoft Azure", Retrieved on: Jan. 12, 2016; Available at: https://azure.microsoft.com/en-us/, 7 Pages.
Murray, et al., "Naiad: A Timely Dataflow System", In Proceedings of the Twenty-Fourth ACM Symposium on Operating Systems Principles, Nov. 3, 2013, pp. 439-455.
Office action for U.S. Appl. No. 14/109,643, dated Dec. 31, 2015, Chandramouli et al., "Analytical Data Processing Engine", 15 pages.
Office action for U.S. Appl. No. 14/109,643, dated Apr. 29, 2016, Chandramouli et al., "Analytical Data Processing Engine", 18 pages.
Office action for U.S. Appl. No. 14/109,643, dated Aug. 13, 2015, Chandramouli et al., "Analytical Data Processing Engine ", 11 pages.
Okcan, et al., "Processing Theta-Joins using MapReduce", In Proceedings of the ACM SIGMOD International Conference on Management of data, Jun. 12, 2011, pp. 949-960.
Pavlo, et al., "A comparison of approaches to large-scale data analysis", In Proceedings of the ACM SIGMOD International Conference on Management of data, Jun. 29, 2009, pp 165-178.
Stonebraker, et al., "C-store: A Column-oriented DBMS", In Proceedings of the 31st international conference on Very large data bases, Aug. 30, 2005, pp. 553-564.
Thusoo, et al., "Hive—A Warehousing Solution Over a Map-Reduce Framework", In Proceedings of the VLDB Endowment, vol. 2, Issue 2, Aug. 24, 2009, pp. 1626-1629.
Tucker, et al., "Exploiting Punctuation Semantics in Continuous Data Streams", In IEEE Transactions on Knowledge and Data Engineering, vol. 15, Issue 3, May 2003, 14 pages_.

(56) References Cited

OTHER PUBLICATIONS

Weimer, et al., "REEF: Retainable Evaluator Execution Framework", In Proceedings of the ACM SIGMOD International Conference on Management of Data, May 27, 2015, pp. 1343-1355.

Xin, et al., "Shark: SQL and Rich Analytics at Scale", In Proceedings of the ACM SIGMOD International Conference on Management of Data, Jun. 22, 2013, pp. 13-24.

Yu, et al., "DryadLINQ: a System for General-Purpose Distributed Data-Parallel Computing using a High-Level Language", In Proceedings of the 8th USENIX conference on Operating systems design and implementation, Dec. 8, 2008, pp. 1-12.

Zaharia, et al., "Discretized Streams: An Efficient and Fault-Tolerant Model for Stream Processing on Large Cluster" In Proceedings of the 4th USENIX conference on Hot Topics in Cloud Computing, Jun. 12, 2012, 6 pages.

Zhang, et al., "Lightweight Distributed Execution Engine for Large-Scale Spatial Join Query Processing", In Proceedings of IEEE International Congress on Big Data, Jun. 27, 2015, 8 pages.

\* cited by examiner

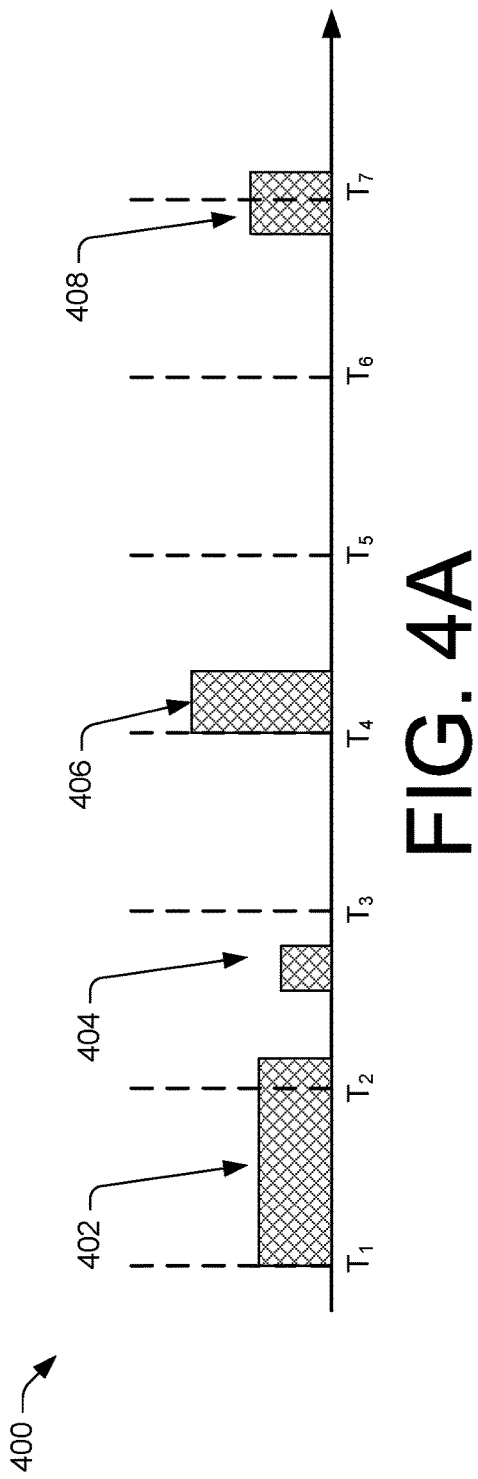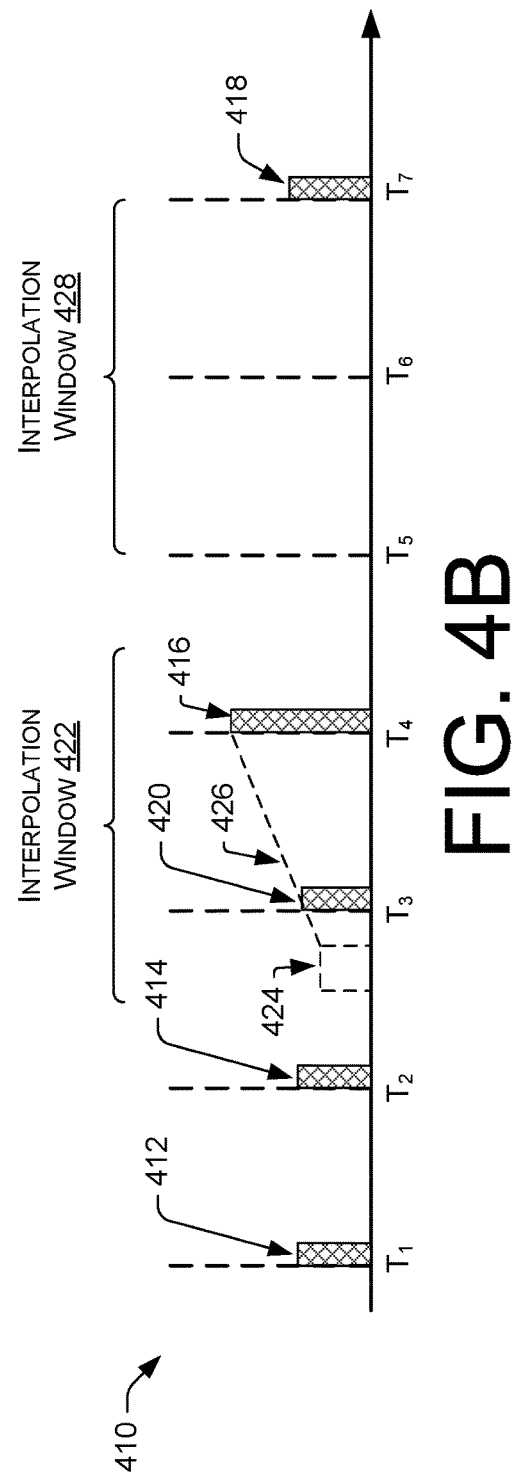
FIG. 4A
FIG. 4B

DIGITAL SIGNAL PROCESSING OVER DATA STREAMS

BACKGROUND

Increasingly, large amounts of data originate from networks of sensors and devices. Query processing and data analytics platforms may analyze the data in order to derive insights from the data. In some cases, efficient analysis of such large amounts of data may be difficult to perform in a cost-effective manner. Further, one set of technologies may be employed in the context of using relational operators to process data, while another set of technologies may be employed in the context of performing digital signal processing. Additionally, different technologies may be employed in the context of online data analytics and offline temporal-relational data. However, to achieve an analysis across different architectures of both online and offline data, multiple technologies would have to be used. Analyzing data and/or transferring data across multiple technologies can be computationally expensive, inefficient, and time consuming.

SUMMARY

The techniques and/or systems described herein are directed to providing deep integration of digital signal processing (DSP) operations with a general-purpose query processor. The techniques and/or systems described herein provide a unified query language for processing temporo-relational and signal data, provide mechanisms for defining DSP operators, and support incremental computation in both offline and online analysis. The deep integration of DSP operations and query processing can improve a functioning of a computer by reducing an amount of data that must be passed back and forth between separate query databases and DSP processors. Further, the deep integration of DSP operations and query processing reduces a latency of processing and allows for real-time processing on a huge volume of data events, on the order of a trillion data events per day.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 4A illustrates a graphical representation of non-uniform input events.

FIG. 4B illustrates a graphical representation of performing sampling and interpolation of the non-uniform input events to generate a uniform signal.

DETAILED DESCRIPTION

Figure 1:
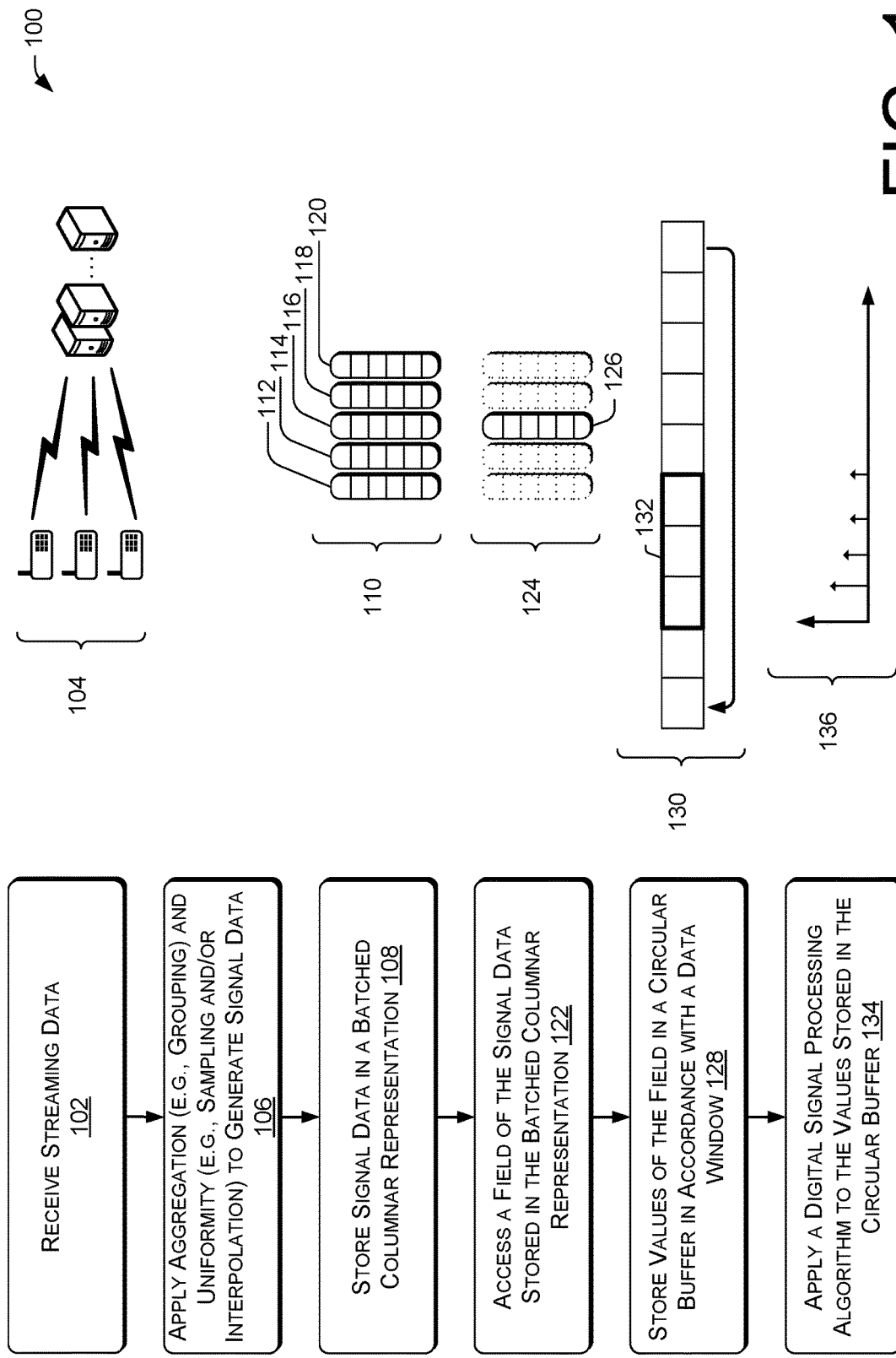
FIG. 1 illustrates a pictorial flow diagram of a process implementing digital signal processing (DSP) over data streams.

The techniques and/or systems described herein provide improved integration of digital signal processing (DSP) operations with a query processor. For example, streaming data can be received from one or more sensors, aggregated into groups, and processed to result in an aggregated and uniform signal. The aggregated and uniform signal can be stored in a batched columnar representation for efficient batched processing. An array of signal data can be read from memory into a circular buffer to apply a digital signal processing (DSP) algorithm for processing the data. Data of the array of signal data can be provided to the DSP algorithm based on a window size associated with the DSP algorithm. Additional data can be written to the circular buffer and incrementally processed to generate a result that can be applied to the previously-generated DSP result. A system including such deep integration of DSP operations with a query processor can be referred to as a streaming DSP system.

In some instances, the streaming DSP system can operate on either offline data (e.g., an existing corpus of data) or online data (e.g., streaming data arriving at various points in time).

In some instances, steaming data can include data events reflecting data gathered from one, hundreds, thousands, or millions of sensors. By way of example and without limitation, a streaming DSP system can receive weather data from sensors, where each reading has the format of <SensorID, Time, Value1 (e.g., temperature), Value2 (e.g., humidity), Value3 (e.g., pressure), . . . , ValueN)>.

In some instances, streaming data can be received with a plurality of data values (e.g., temperature readings) corresponding to a same instant in time. For example, two sensors (e.g., with different sensor IDs) can each provide a reading of a temperature at the same instant in time. Thus, the readings can be aggregated to ensure that at most one stream event is active at any point in time. In some instances, and in general, an aggregation function can be applied to group multiple input values based on certain criteria to form a single value of more significant meaning or measurement. By way of example, and without limitation, aggregation functions can include such functions as averaging functions (e.g., arithmetic mean) or counting functions (e.g., counting a number of specified events).

Further, because many DSP algorithms operate on data uniformly-spaced in time, aggregated data can be processed to generate uniform aggregated data. In some instances, an interpolation function and/or a sampling function can be applied to the grouped data in order to generate uniformly-spaced data. In some instances, and without limitation, an interpolation function can construct new data points within a range of a discrete set of known data points. In some instances, a sampling function can convert irregularly-spaced input events into uniformly spaced values corresponding to a uniform sampling time.

Following the generation of an aggregated (grouped) and uniform (interpolated and/or sampled) signal, the aggregated and uniform signal can be stored in a batched columnar data representation in memory. For example, temperature readings over time can be stored in memory such that the values are in a physical, contiguous (e.g., consecutive) column in memory. In some instances, each value (e.g., Value1) of an aggregated and uniform signal can be stored as a "struct" (e.g., as referred to in the C and C# programming language), such that the struct defines a physically grouped list of data (or variables) to be placed under one name in a block of memory, allowing the data to be accessed via a single pointer, for example. Each field of the sensor reading can be stored in a separate array, with the separate arrays comprising the batched columnar array. Thus, the data corresponding to the aggregated and uniform signal can be stored in a batched columnar representation which allows for highly efficient access (e.g., read and write) and processing.

Data stored in the batched columnar representation can be operated on in batches, which can further provide efficiencies for data processing. For example, rather than performing a series of sequential operations on a single piece of data, data can be collected over time and associated with a particular group key, which can define a particular batch. The particular batch can be processed together (e.g., by performing fine-grained work), thereby reducing the processing overhead operations (e.g., coarse-grained work) associated with loading and unloading instructions and/or data within the streaming DSP system. In some instances, fine-grained work can include carefully written loops that leverage data locality, instruction locality, compiler loop-unrolling, unsafe code, code generation, etc. In some instances, examples of the coarse-grained work can include handing off data across cores, allocating messages, and updating memory pools.

In some instances, each operator in a workflow can receive a batch, process events within the batch, and write output events into an output batch. The output batch is not handed off to a next downstream operator until the batch is full, or a control event (e.g., a latency control message (punctuation)) is received, which can force the system into flushing partial batches and producing output immediately.

With the signal data stored in the batched columnar representation, arrays of data values can be easily read from memory and written to a circular data buffer for DSP operations to be applied thereto. In some instances, data can be written to the circular buffer in accordance with a data window, which can correspond to an amount of data (e.g., number of data values of a particular array) to be written in the circular buffer. As the data in the circular buffer is processed, additional data is copied to the circular buffer with a particular hop size (e.g., partial window size), such that each value in the circular buffer can be written to the circular buffer once without unnecessary operations.

Further, the streaming DSP system can perform incremental processing on data in the circular buffer, further reducing an amount of processing and improving the operation of the computer. For example, a DSP operation can be performed on data within a particular data window, generating a DSP output and storing a state of that output and/or of the streaming DSP system. When an additional hop of data is copied to the circular buffer, rather than processing a full window of data (including the newly-added data), the streaming DSP system can apply the DSP operation to the incremental amount of data, and when an incremental DSP output is generated, the incremental DSP output can be applied to the previously generated DSP output.

The techniques and/or systems described herein can improve a functioning of a computing device by reducing an amount of processing and/or by reducing an amount of memory required for performing DSP on streaming data. In some instances, processing the data stored in the batched columnar representation can reduce an amount of data needed for processing by ignoring data that is not required for an operation. Further, performing incremental processing of DSP operations reduces an amount of data to be processed by applying an incremental output to a stored state of the DSP operations. Further, an amount of memory for the DSP operations can be reduced by using a circular buffer, which compactly stores the windowed signal data for processing. Additionally, the streaming DSP system discussed herein can improve a functioning of a network by reducing an amount of data processed between computing devices within the system. By deeply integrating the DSP operations into the query processing engine, the passing of data between disparate systems is reduced.

Further, deeply integrating DSP operations into the query processing engine can reduce unnecessary steps existing in inefficient database systems coupled with numerical frameworks (referred to here as loose system coupling). For example, such loose system coupling comes with significant processing overheads. For instance, executing DSP algorithms in a numerical computing framework can require exporting data from a database, converting the data into a particular format associated with the numerical computing framework, running programs, scripts, or operations associated with the framework, converting an output of the numerical computing framework into a relational format used by the database, and importing the data into the database. In some instances, sending data back and forth between the database and the numerical computing framework might dominate an execution time, for example when running particular DSP operators. Further, the additional network traffic also increases the latency of processing, which makes this approach particularly unsuitable for real-time processing. Thus, by deeply integrating the DSP operations into the query processing engine, the streaming DSP system improves a functioning of computers and a network by avoiding additional data transfer and processing.

Various examples for implementing the streaming DSP system are described herein with reference to FIGS. 1-10.

FIG. 1 illustrates a pictorial flow diagram of a process 100 implementing digital signal processing (DSP) over data streams.

At 102, the operation can include receiving streaming data. In some instances, the streaming data can be received from one or more sensors, computing devices, or the like, and can represent discrete-time sequences of real or complex values, which can be referred to as samples. In some instances, real-valued signals (e.g., signals including real numbers) can originate from sensors measuring physical phenomena. In some instances, complex-valued signals (e.g., signals including complex numbers) can result after processing signals in the frequency domain. In some instances, the streaming data can include sequences of structures carrying multiple sensor measurements. In one example, such as audio processing, streaming data can comprise different audio channels. In another example, such as video processing, streaming data can comprise sequences of video frames. The illustration 104 represents a plurality of signals received at a service provider, such as the streaming DSP system of the instant disclosure.

At 106, the operation can include applying aggregation and uniformity to the streaming data to generate signal data. In some instances, applying an aggregation function can include one or more grouping functions such as applying an averaging function or a count function to ensure that one data value is active for any one particular time. In some instances, the aggregation function can be applied to generate aggregated or grouped data. In some instances, applying uniformity can include applying an interpolation function to the aggregated or grouped data to generate missing values (or otherwise handle missing values at various time points), and in some instances, uniformity operations can include sampling the aggregated or grouped data to generate at values at uniform time points. In some instances, the operation 106 can be considered to convert an incoming stream of data into a signal.

At 108, the operation can include storing signal data in a batched columnar representation. For example, the signal dataset can include a sequence of columnar batches. A columnar batch can hold one array for each column in the event. For example, for a particular data stream stored in a batched columnar representation, two arrays hold the start-time and end-time values for all events in the batch. In some instances, the streaming DSP system can associate a grouping key with each event in order to enable efficient grouped operations. For example, the streaming DSP system can precompute and store grouping keys and key hash values as two additional arrays in a batch, which can define, in part, each group within the batched columnar representation. In some instances, a batched columnar representation can also include an absentee bitvector to identify inactive rows in the batch (e.g., representing null data). For example, a batched columnar representation 110 can including a plurality of arrays 112, 114, 116, 118, and 120.

At 122, the operation can include accessing a field of the signal data stored in the batched columnar representation 110. For example, a batched columnar representation 124 (which can correspond to the batched columnar representation 110) can include an array 126, which can correspond to values associated with a measurement over time. The array 126 can include a field of the signal data, and at operation 128, the array 126 can be accessed (e.g., read from sequential locations in memory) and the operation can include storing values of the field in a circular buffer 130 in accordance with a data window 132. For example, the circular buffer 130 can store data, and the data in a window 132 can be operated on at operation 134. The operation 134 can include applying a digital signal processing (DSP) operation to the values stored in the circular buffer 130. In some instances, the operation 134 can include storing a state of the DSP operation as batches are processed by the streaming DSP system, and/or the operation 134 can include incrementally processing data added in a hop (e.g., a partial window) and combining the incremental processing output with the stored state data to generate an output 136. In some instances, the output 136 can be transmitted to various computing devices, presented (e.g., for display) via one or more interfaces (e.g., user interfaces, APIs, etc.), and/or can be used as input for additional processing operations of the streaming DSP system, as described herein.

In one particular implementation, example code representing aspects of the operations in FIG. 1 is presented below, illustrating aggregating and interpolating to generate signal data, and performing a DSP operation on the generated signal data:

$$\text{var } q=\text{stream} \quad (1)$$

$$.\text{Map}(s=>s.\text{Select}(e=>e.\text{Value}), e=>e.\text{SensorId}) \quad (2)$$

$$.\text{Reduce}(s=>s.\text{Sample}(100, 0, p=>p.\text{FirstOrder}(\ ))) \quad (3)$$

$$.\text{Window}(512, 256, \text{true}, \quad (4)$$

$$w=>w.\text{FFT}(\ ).\text{Select}(a=>f(a)).\text{InverseFFT}(\ ), \quad (5)$$

$$a=>a.\text{Sum}(\ )); \quad (6)$$

Figure 2:
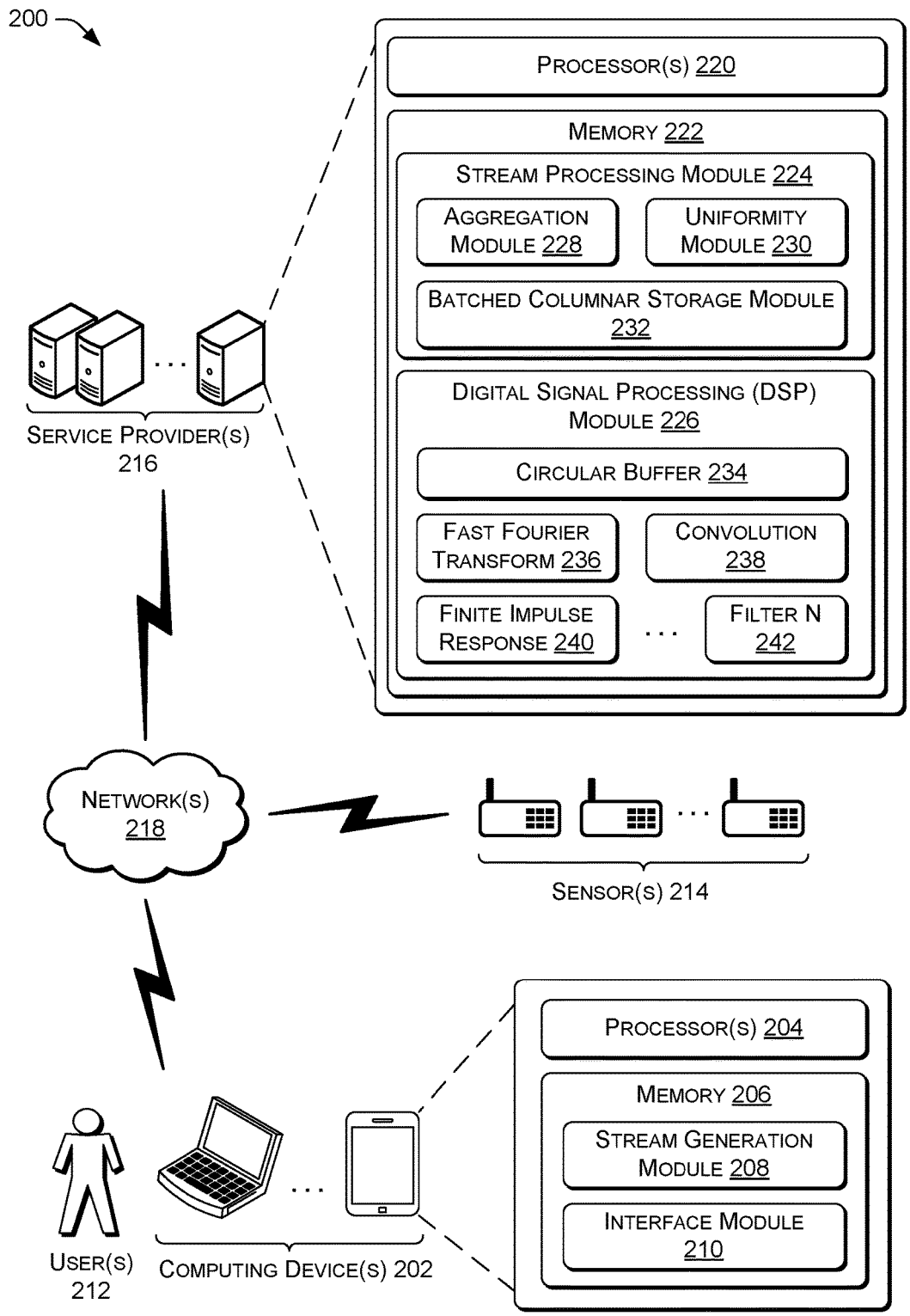
FIG. 2 illustrates an example environment for deep integration of DSP operations with a general-purpose query processor.

FIG. 2 illustrates an example environment 200 for deep integration of DSP operations with a general-purpose query processor. The environment 200 includes computing device(s) 202 having processor(s) 204 and a memory 206 including a stream generation module 208 and an interface module 210. In various instances, the stream generation module 208 can generate one or more streams, as described herein. In some instances, the interface module 210 can include one or more APIs that operates to receive queries from one or more user(s) 212 and/or operates to receive parameters and/or selections such as a particular DSP operation to be applied, a window size and hop size associated with the DSP operation, etc., as to be discussed in this disclosure. The environment 200 also includes one or more sensor(s) 214 that can generate streams to provide to one or more service provider(s) 216 via the computing device(s) 202 and/or a network 218. In some instances, the service provider(s) 216 provide one or more services to the computing device 202, such as DSP operations over the streaming data. To that end, the service provider 216 can include processor(s) 220 and a memory 222 including a stream processing module 224 and a digital signal processing (DSP) module 226 to provide the streaming DSP system, which is explained in connection with the figures provided in this disclosure.

The computing device 202 can include, but is not limited to, any one of a variety of computing devices, such as a smart phone, a mobile phone, a personal digital assistant (PDA), an electronic book device, a laptop computer, a desktop computer, a tablet computer, a portable computer, a gaming device, a personal media player device, a server computer, a wearable device, or any other electronic device.

As introduced above, the computing device 202 can include one or more processor(s) 204 and memory 206. The processor(s) 204 can be a single processing unit or a number of units, each of which could include multiple different processing units. The processor(s) 204 can include one or more microprocessors, microcomputers, microcontrollers, digital signal processors, central processing units (CPUs), graphics processing units (GPUs), security processors (e.g., secure cryptoprocessors), and/or other processors. Alternatively, or in addition, some or all of the techniques described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor(s) 204 can be configured to fetch and/or execute computer-readable instructions stored in the memory 206.

The memory 206 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PCM), Static Random-Access Memory (SRAM), Dynamic Random-Access Memory (DRAM), other types of Random-Access Memory (RAM), Read-Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The one or more sensor(s) 214 can also include a processor and memory similar to those described in connection with the computing device(s) 202, and can further include any processing, hardware, and/or circuitry to generate one or more data streams to provide streaming data to the service provider 216.

In various embodiments, the computing device 202 can communicate with the service provider 216 via one or more wired or wireless networks 218, such as the Internet, a Mobile Telephone Network (MTN), or other various communication technologies.

In various embodiments, the memory 206 can include an operating system configured to manage hardware and services within and coupled to the computing device 202 for the benefit of other components and other devices.

The stream generation module 208, the interface module 210, the stream processing module 224, and the digital signal processing module 226 can include hardware and/or software components. For example, the stream generation module 208, the interface module 210, the stream processing module 224, and the digital signal processing module 226 can be implemented by one or more modules stored in the memory 206 or 222, respectively, and/or by one or more components of the processor(s) 204 or 220, respectively. As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions can be implemented (e.g., performed) in whole or in part by hardware logic components, such as FPGAs, ASICs, ASSPs, state machines, CPLDs, other logic circuitry, SoCs, and so on.

The stream generation module 208 can perform operations to generate one or more streams of data in accordance with embodiments of the disclosure. For example, streams of data can include readings or samples, where each reading or sample has the format of <SensorID, Time, Value1 (e.g., temperature), Value2 (e.g., humidity), Value3 (e.g., pressure), . . . , ValueN)>. As discussed above, streaming data can include real numbers, complex numbers, a plurality of measurements, payloads, and/or parameters, functional payloads, etc.

In one specific implementation, the streaming DSP system can represent a stream of data with a payload type T as an instances of a class called Streamable<T>. In this example, when implemented in the C# programming language, the streaming DSP system can capture event contents using a C# payload type:

| | |
|---|---|
| struct SensorReading { | (7) |
|     long SensorId; long Time; doubleValue; | (8) |
| } | (9) |

In this example above, the stream of temperature readings can be of the type Streamable<SensorReading>.

The interface module 210 can perform operations to provide one or more interfaces to interact with the streaming DSP system in accordance with embodiments of the disclosure. For example, the interface module 210 can provide one or more graphical user interfaces (GUIs) for a user to interface with the streaming DSP system. In some instances, the interface module 210 can provide one or more application programming interface (API) allowing a user to provide queries on the data, select a DSP operation, and/or specify processing in terms of operations, inputs, outputs, underlying data types, etc. In some instances, the interface module 210 can allow a user to set a type of DSP operation, a window size, a hop size, and/or to implement any of the features discussed herein. In some instances, the interface module 210 can present data on a display of the computing device 202, whereby the data is an output of the streaming DSP system.

The stream processing module 224 can perform operations to process streaming data in accordance with embodiments of the disclosure. For example, the steam processing module 224 can receive streaming data, sort the streaming data, perform aggregation, uniformity, sampling, and/or interpolation on the streaming data, perform non-uniform and uniform signal operations on streaming data (or aggregated and uniform streaming data), and/or store the streaming data in a batched columnar representation. The stream processing module 224 can further include an aggregation module 228, a uniformity module 230, and a batched columnar storage module 232.

The aggregation module 228 can perform operations to aggregate streaming data to ensure that at most one stream event is active at any point in time. In some instances, the aggregation module 228 can apply one or more aggregation functions to streaming data, such as an averaging function, counting function, summing function, power function, energy function, etc. In one particular implementation, an aggregation function can be provided by applying an aggregate function of the input stream, which can be represented as:

$$var\ s0=stream.Average(e=>e.Value) \quad (10)$$

The uniformity module 230 can perform operations to convert irregularly-spaced streaming data into uniformly-spaced, regularly-spaced, or equally-spaced samples. A non-exhaustive list of example operations to be performed on non-uniform (N) or uniform data (U) is illustrated below in Table 1.

TABLE 1

| Signal Operations | Type |
| --- | --- |
| Relational operators (e.g., select, where, join, ALJ) | N + U |
| Arithmetic operations (e.g., +, −, *) | N + U |
| Basic signal operation (e.g., scale, shift) | N + U |
| Functional signal operations | N |
| Sampling, upsampling, downsampling | N + U |
| Interpolation | U |
| Uniform signal aggregates (e.g., sum, power, energy) | U |
| Framework for user-defined digital filters (e.g., FIR & IIR filters, correlation, convolution, diff) | U |
| Framework for user-defined window operators (e.g., FFT, windowing functions, auto-correlation, cross-correlation, element-wise product) | U |

Therefore, the uniformity module 230 can process data prior to certain functions (e.g., as illustrated in Table 1) being applied to the data which utilize uniform data as inputs.

The batched columnar storage module 232 can perform operations to receive streaming data and organize and store the streaming data in a batched columnar representation. In some instances, streaming data can be stored in a batched columnar representation as it is received by the streaming DSP system (e.g., at the service provider 216), or streaming data can be aggregated and/or processed for uniformity before storing in a batched columnar representation. As streaming data is received and converted into signal data, the signal data stored in the batched columnar representation as an array can be operated on (e.g., exposed) by DSP operations, including implementations that exploit single instruction, multiple data (SIMD) operations on modern processors.

In one particular implementation, as streaming data is received in the streaming DSP system, a StreamEvent structure can be used to represent an event with payload type T. In some instances, the structure provides static methods for creating stream events, including point events with a data window of one time unit. In the above example, users 212 can ingest sensor readings as point events at time t as:

$$StreamEvent.CreatePoint(t, new\ SensorReading\ \{\ldots\}) \quad (11)$$

In some instances, and with regards to a physical layout of data in memory, a dataset is represented as a sequence of columnar batches. A columnar batch can hold one array for each column in the event. For example, two arrays hold the start-time and end-time values for all events in the batch. In some instances, the streaming DSP system can associate a grouping key with each event in order to enable efficient grouped operations. In some instances, the streaming DSP system can precompute and store the grouping keys and key hash values as two additional arrays in a batch, and/or can include an absentee bitvector to identify inactive rows in the batch.

In some instances, the streaming DSP system can create columnar batches during query compilation. For example, a generated batch for SensorReading can be represented as:

| | |
| --- | --- |
| class ColumnarBatchForSensorReading<TK> { | (12) |
|     long[ ] SyncTime; long[ ] OtherTime; // data window | (13) |
|     TK[ ] Key; int[ ] Hash; | (14) |
|     long[ ] BitVector; | (15) |
|     long[ ] SensorId; long[ ] Time; // payload | (16) |
|     double[ ] Value; // | (17) |
| } | (18) |

In some instances, memory operations within the streaming DSP system share these arrays with reference counting. For example, in some instances, SyncTime and Time can point to the same physical array. Further, the memory operations can also pool arrays using a global memory manager to alleviate the cost of memory allocation and garbage (data) collection.

Further, the stream processing module 224 can include query language with relational operations and temporal-relational operations. In some instances, relational operations can include operations such as joins, filtering, or group-by aggregation. For example, relational operators can be utilized to group signals by different sources (e.g., by a sensor ID) or join signals with historical and reference data.

In one particular implementation, these temporal or relational operators can be exposed using the class Streamable<T>. In some instances, each operator in the streaming DSP system can be a function from stream to stream, which allows for elegant functional composition of queries. Each method represents a physical operator (e.g., Where for filtering) and returns a new Streamable instance, which allows users to chain an entire query plan. For example, assuming s0 is a data source of type Streamable<SensorReading>, invalid readings can be discard using a "lambda expression" which can specify a condition for keeping each stream event in an output stream. In one particular implementation, a lambda expression can be used to discard values greater than 100 using the Where operator:

$$var\ s1=s0.Where(e=>e.Value>100) \quad (19)$$

A query operator can accept and/or produce a sequence of columnar batches. In some implementations, a compiler for the streaming DSP system can dynamically generate operators and inline lambdas (such as the Where, as illustrated above) in tight per-batch loops to operate directly over columns for high performance. For example and without limitation, relational operators can include (e.g., selection, join, anti-join) as well as new temporal operators for defining windows and sessions.

In some instances, grouped computation can be implemented using Map and Reduce operations with temporal support to enable parallel query execution on each sub-stream corresponding to a distinct grouping key. Considering a shortened version of the query associated with FIG. 1, an exemplary query can be represented as:

$$var\ s2= \quad (20)$$

$$s1.Map(s=>s.Select(e=>e.Value),e=>e.SensorId) \quad (21)$$

$$.Reduce(s=>s.Sample(10,0), \quad (22)$$

$$(k,p)=>new\ Result\ \{SensorId=k,Temp=p\}) \quad (23)$$

The first argument to Map specifies a sub-query (here, the stateless Select operation) to be performed in parallel on the input stream, while the second argument specifies the grouping key (SensorId) to be used for shuffling the result streams. The first argument to Reduce specifies the query to be executed per each group key (the Sample operation), and the second argument allows the grouping key and the per-group payload to be combined into a single result.

In some instances, temporal join operations can be performed to correlate (or join) two streams based on time overlap, with an (optional) equality predicate on payloads. In one example, the filtered SensorReading stream s1 can be augmented with additional information from another reference stream ref1 that contains per-sensor location data. Such a query can be represented as:

$$\text{var } s3=s1.\text{Join}(\text{ref1},\tag{24}$$

$$l=>l.\text{SensorId},r=>r.\text{SensorId},(l,r)=>\tag{25}$$

$$\text{new Result }\{r.\text{SensorLocation},l.\text{Time},l.\text{Value}\});\tag{26}$$

The second and third parameters to Join represent the equi-join predicate on the left and right inputs (SensorId), while the final parameter is a lambda expression that specifies how matching input tuples are combined to construct the result payload. The output stream s3 is of type Streamable<Result>.

The digital signal processing (DSP) module 226 can perform operations to perform one or more DSP operations in accordance with embodiments of the disclosure. The DSP module 226 can further include a circular buffer 234, and one or more modules to perform DSP operations such as a Fast Fourier Transform 236, a convolution 238, a finite impulse response (FIR) 240, and a filter N 242 representing any filters (e.g., an infinite impulse response (IIR) filter) in accordance with this disclosure.

In some instances, the DSP module 226 can receive data from the batched columnar storage module 232 in accordance with a data window associated with a particular DSP operation (e.g., 236, 238, 240, 242) and/or in accordance with a user-specified value. In some instances, the DSP module 226 can receive a hop size associated with an incremental processing size to be performed throughout the particular DSP operation. Signal data can be written to the circular buffer 234 in accordance with the data window size, and a DSP operation can be performed on the data. The DSP module 226 can maintain a state of the DSP operations to enable incremental processing while eliminating redundant processing.

The operations of these modules 208, 210, 224, 226, 228, 230, 232, 234, 236, 238, 240, and 242 are further explained in connection with FIGS. 1 and 3-10 of this disclosure.

The service provider 216 can include one or more computing devices, such as one or more desktop computers, laptop computers, servers, and the like. The one or more computing devices can be configured in a cluster, data center, cloud computing environment, or a combination thereof. In one example, the one or more computing devices provide cloud computing resources, including computational resources, storage resources, and the like, that operate remotely from the computing device 202.

The environment 200 also includes the one or more users 212 to employ the computing device 202. The one or more users 212 can interact with the computing device 202 to perform a variety of operations.

Figure 3A:
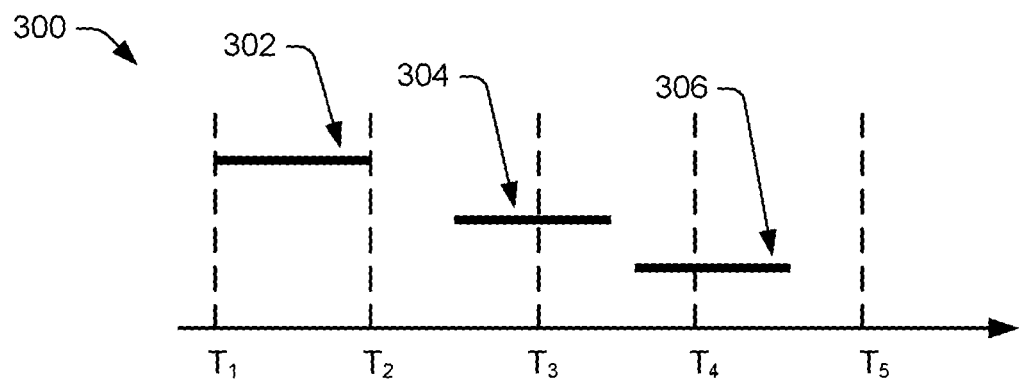
FIG. 3A illustrates a graphical representation of a signal with a constant payload.

FIG. 3A illustrates a graphical representation 300 of a signal with constant payloads 302, 304, and 306. For example, the representation 300 can describe discrete-time signals and step-like continuous signals. However, in practice, users can desire to work with more general continuous signals whose values can be expressed as a function of time, as illustrated in FIG. 3B.

Figure 3B:
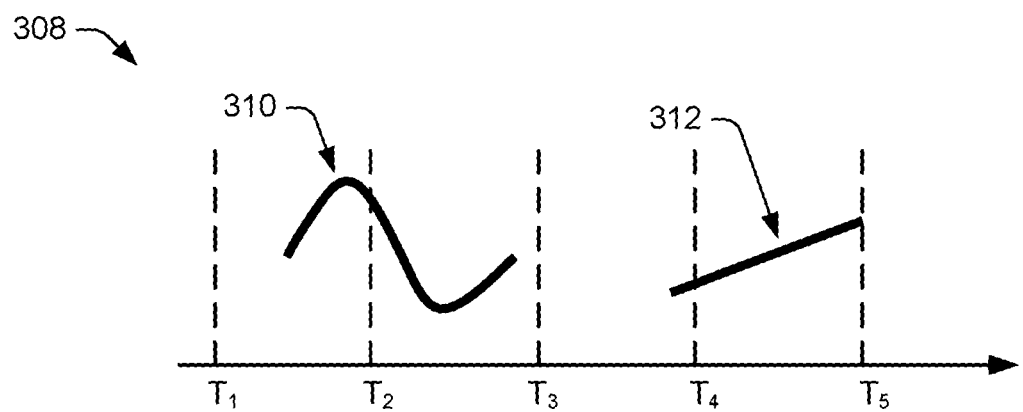
FIG. 3B illustrates a graphical representation of a signal with a functional payload.

FIG. 3B illustrates a graphical representation 308 of a signal with functional payloads 310 and 312. For example, in amplitude modulation, an operation can multiply an input signal with a continuous carrier signal, which can be a sine wave of a given frequency and amplitude.

To support (pseudo-)continuous signals with the tempo-relational data model, one can materialize (e.g., evaluate) point events at every timestamp from the function domain. However, such an implementation incurs huge processing and memory overheads. In some implementations, to capture continuous signals efficiently, the streaming DSP system can represent continuous signals as functional signal payloads that carry a lambda function describing how to compute signal values at any point in time. Functional payloads, such as the functional payloads 310 and 312, can delay materialization of signal events until expressly requested by an operation or a user.

In some instances, the streaming DSP system can support two types of functional payloads, referred to as 1) heterogeneous functional payloads and 2) homogeneous functional payloads.

With respect to heterogeneous functional payloads, a lambda function Func<long,T> can be assigned to each stream event. The lambda function can express the payload value as a function of time. Each such functional payloads can be represented as instances of TFuncPayload<T>. For example, referring to the functional payload 310 of FIG. 3B, the functional payload 310 can be represented as:

$$\text{var evt1=StreamEvent.CreateInterval}(40,80,\tag{27}$$

$$\text{new }T\text{FuncPayload<double>}(t=>\text{Sin}(2*\text{Pi}*t/40)))\tag{28}$$

In order to enable processing of signals with functional payloads, TFuncPayload<T> implements TArithmetic<TFuncPayload<T>>. For example, adding two functional payloads creates a functional payload with a lambda function expressing the addition. One particular representation of adding functional payloads is represented below as:

| | |
|---|---|
| TFuncPayload<T> Plus(TFuncPayload<T> b) { | (29) |
|     return new TFuncPayload<T>(t => f(t) + b.f(t)); | (30) |
| } | (31) |

In some instances, processing signals with functional payloads can be similar or same as processing any other payload type, such as a constant payload type. For instance, adding two functional signals can correspond to a temporal join in which any matching events yield a summed functional payload, as described above. In some implementations, while processing signals with functional payloads, the functional representation of values can be maintained in functional form so as to avoid materialization. In this manner, the functional payloads improve a functioning of a computer by reducing processing and memory costs associated with evaluating continuous signals.

In some instances, functional payloads can be materialized (e.g., evaluated) at discrete time points to obtain a uniformly-sampled signal with a desired sampling period and offset. For example, a signal fs0 can be sampled containing functional payloads to materialize events at every 10 time units, as represented below:

$$\text{var }fs1=fs0.\text{Sample}(10); \text{ // Materialization}\tag{32}$$

In some instances, using TFuncPayload<T> enables heterogeneity in assigning lambda functions to payloads, that is, each event can take a different function, as illustrated by the different functional payloads 310 and 312. This function heterogeneity comes at the cost of more expensive memory management during query evaluation. In some instances, new stream events can instantiate lambda objects. Given that these lambdas have different structures, the various different lambda objects cannot be efficiently shared among events or re-used through memory pooling. Instead, in some instances, lambda objects can be allocated on the heap (e.g., a dynamically allocated memory space in the streaming DSP system), in contrast to allocating the lambda objects to the stack (in memory), and released through garbage collection, which can increase memory management overheads.

In some instances, one lambda function can be allocated to an entire signal (e.g., as a homogeneous functional payload) rather than allocating a lambda function to each event (e.g., as heterogeneous functional payloads), in order to process functional payloads more efficiently. In such a case, stream events can share a same lambda function, hence "homogenous" in the name, and their payloads can represent the function arguments. For example, stream events can be created with payloads being the arguments of a sine function, such as represented by:

$$\text{var event=StreamEvent.CreateInterval(0,100,} \quad (33)$$

$$\text{new Sin Args \{Freq=50.0,Phase=0.0\});} \quad (34)$$

In this example, each signal maintains a property that stores its lambda function. Further, a sine function can be associated with the signal s1 as follows:

$$\text{var } s2 = s1.\text{setProperty( )setFunction(} \quad (35)$$

$$(t,e) => \text{Sin}(2*\text{Pi}*t/e.\text{Freq}+e.\text{Phase})) \quad (36)$$

The default signal function is the identity function $(t,e) => e$.

In some instances, supporting homogeneous functional payloads can require a change of the signature of the signal type from SignalStreamable<T> to SignalStreamable<TIn, TOut>, where TIn is the payload type (e.g., Sin Args) and TOut is the result type (e.g., double). In this example, the lambda function can be of type Func<long,TIn,TOut>.

Binary signal operations over homogeneous functional payloads use temporal joins to pair matching payloads from both sides as 2-tuple structures. For example, multiplying the sine signal s2 with a complex-valued constant signal can produce payloads of the type Tuple<Sin Args,Complex>. Such payloads can serve as arguments of the stream-level lambda function that multiplies these two signals.

In some instances, homogeneous functional payloads can enable more efficient signal processing than heterogeneous functional payloads. During query compilation, homogeneous payloads can be "flattened" into a sequence of parameters, and columnar batch representations can be created. In the previous example, the generated batch for the tuple structure can be represented as:

```
struct ColumnarTuple {                         (37)
    double[ ] Freq; double[ ] Phase; Complex[ ] V;  (38)
}                                              (39)
```

These columnar arrays are memory-pooled and shared with reference counting during processing, which alleviates the cost of memory allocation and garbage collection, further improving a functioning of a computer in the streaming DSP system.

Signal operations can be performed on signals, such as those illustrated in FIGS. 3A and 3B. For example, a scale operation multiplies signal values with a scalar using a select operator. In some instances, a shift operation delays and/or advances a signal by changing the time intervals of its events using an alter-lifetime operator.

In some instances, basic arithmetic operations such as addition, subtraction, or multiplication can be performed on signals, as these operations are guaranteed to produce at most one event at any point in time. Further, any signal operation that uses a temporal join to match events outputs a signal. However, not every binary stream operation can be lifted to the signal domain. For example, a union of two signals can produce a stream with overlapping events, so this operator needs to remain in the Streamable domain. Thus, additional determinations can be made to ensure that signal operations result in a valid signal.

FIG. 4A illustrates a graphical representation 400 of non-uniform input events 402, 404, 406, and 408. For example, the graphical representation 400 illustrates the input events occurring at times along a timeline indicated by times $T_1$, $T_2$, $T_3$, $T_4$, $T_5$, $T_6$, and $T_7$. In some instances, non-uniform input events comprise overlapping-free stream events of arbitrary forms. As illustrated in FIG. 4A, non-uniform input events (e.g., a non-uniform signal or a non-uniform stream) can have events with different lifetimes, events appearing at irregular time instants (e.g., due to network delays), or missing events (e.g., due to bad communication). For example, the input event 404 is misaligned between times $T_2$ and $T_3$. Further, samples are missing at times $T_5$ and $T_6$. As some DSP operations require a uniform signal for processing, the streaming DSP system can perform processing to convert non-uniform input events into a uniform signal, and/or can perform interpolation to recover missing values in the streaming data.

FIG. 4B illustrates a graphical representation 410 after performing sampling and interpolation of the non-uniform input events to generate a uniform signal. For example a sampling function can be applied to the non-uniform input events at discrete time intervals $T_1$-$T_7$ to generate the uniformly-samples signals 412, 416, and 418. For example, a sample operator can be used that considers events that are active at predefined sampling beats (e.g., $T_1$, $T_2$, $T_4$, etc.) and ignores in-between and missing events. However, because the input event 404 in FIG. 4A is misaligned (e.g., the input event does not occur at a discrete time interval $T_1$, $T_2$, $T_3$, $T_4$, $T_5$, $T_6$, or $T_7$), interpolation can be applied to generate an interpolated sample 420 at time $T_3$. For example, in an instance where an interpolation window 422 spans the occurrences of an input event 424 (which can correspond to the input event 404) and the sampled signal 416, an interpolation function (e.g., illustrated as a linear interpolation 426) can generate the interpolated signal 420. In some instances, as illustrated by an interpolation window 428, missing values cannot be generated a particular time point, and can be replaced with a zero value or a null value, for example. In some instances, and without limitation, interpolation functions can include piecewise constant interpolation, last-valued, step (zero-order), linear interpolation, polynomial interpolation, spline interpolation, etc.

In some instances, the uniformity module 230 can be utilized to sample and interpolate streaming data to generate uniformly sampled signals. For example, a user can specify a specific type of interpolation function to be used (as described above), as well as a specific interpolation window for use in an interpolation operation.

For example, a uniform signal can be obtained sampling a non-uniform signal using a Sample operator. In some instances, the Sample operator uses a given sampling period T and an offset O to generate point events at timestamps kT+O, where k is integer, at which the source signal has an active stream event. The Sample operator invokes the stream-level lambda function to compute the payload value of each materialized event. Since uniformly-sampled signals are discrete-time signals, they have no stream-level lambda function associated to them. That is, the sampling operator can include evaluating a lambda function at each discrete time point in order to generate an array of values, in contrast to maintaining the representation of values as the lambda function.

Further, the Sample operator supports grouped signal computation. In grouped signals, each stream event carries a group identifier. For example, the specific implementation presented above in connection with FIG. 1 groups stream events by SensorId. In some instances, the Sample operator internally keeps track of active events for each group processed by the Sample operator. As stream events are processed in a non-decreasing sync (interval start) timestamp order, each event can move the global stream time forward. In such cases, the operator can produce samples for each group up to the current time, update the internal state of each group to remove any inactive events, and update the current group to include the current event. If the current state detects overlapping events, the Sample operator can determine that the purported signal is not, in fact, a signal (due to the presence of multiple events at a particular instant in time).

In some instances, an interpolation window (e.g., the interpolation windows 422 and 428) defines a maximum time distance among the reference samples used for interpolation. For instance, in linear interpolation, if two consecutive reference samples are more than one interpolation window apart (e.g., as in the case of the illustrated input samples 406 and 408), the interpolation function can consider them as belonging to two different signal sequences.

In one specific implementation, the streaming DSP system can obtain a uniform signal from FIG. 4A as follows:

$$\text{var } s1=s0.\text{Sample}(30,0,p=>p.\text{FirstOrder}(60)); \quad (40)$$

In some instances, each uniformly-sampled signal maintains a property that stores an interpolation policy. This policy can be used during signal re-sampling, which happens, for instance, in binary operations on uniform signals with different sampling periods.

Continuing with the specific implementation, the Sample operator can implement interpolation on grouped signals. For each group, the Sample operator maintains a finite number of observed samples, which serve as reference points for a given interpolation function. Each stream event with an interval [a, b) generates a sequence of reference points: a start point at [a, a+1), an end point at [b−1, b), and all intermediate points at sampling beats from the interval (a, b).

A per-group interpolator state maintains most recent reference points using a fixed-size circular buffer. The buffer can include at least two samples, which can define the currently active interpolation window. In some instances, higher-order interpolators can buffer more samples. Each interpolator state also encapsulates the interpolation function that corresponds to the chosen interpolation policy. The Sample operator interacts with each interpolator state independently of the interpolation function using the following methods, including but not limited to AdvanceTime, AddPoint, CanInterpolate, and Interpolate.

In some instances, AdvanceTime(long t) invalidates points in the buffer that fall outside the interpolation window ending at time t.

In some instances, AddPoint(long t, T v) overwrites the oldest valid entry in the interpolation buffer with a given reference point.

In some instances, CanInterpolate(long t) returns true when the interpolation buffer is full and t is between the last two reference points.

In some instances, Interpolate(long t) invokes the interpolation function to compute the value at time t.

As the global time moves forward with each stream event, the Sample operator updates the state of each group to include new and invalidate too distant reference points. In some instances, when an interpolation buffer of one group is full, the Sample operator interpolates events at the sampling beats between the last two reference points. In some instances, the Sample operator can be limited to interpolating events occurring in the past. In some instances, the Sample operator preserves a time order of output events, by delaying emitting output events by at most a size of the interpolation window.

The uniformity module 230 can include signal operators that operate on uniformly sampled signals.

One such uniform signal operator can include resampling operations that change a sampling rate of uniformly sampled signals. For example, a function Upsample(n) increases the sampling rate (i.e., decreases the sampling period) of a signal by an integer factor n. The interpolation function computes the values of new intermediate samples. By way of another example, a function Downsample(n) decreases the sampling rate (i.e., increases the sampling period) of a signal by keeping every n-th sample and dropping the others. By way of another example, a function Resample( ) changes the sampling period, offset, and interpolation function of a signal. For instance, the uniform signal represented in FIG. 4B can be resampled to halve the sampling period, change the interpolation policy, and double the interpolation window size. One specific implementation of such resampling is represented below.

$$\text{var } s2=s1.\text{Resample}(30,0,ps=>ps.\text{ZeroOrder}(120)) \quad (41)$$

Another example of a uniform signal operator includes binary arithmetic operations involving uniform signals which utilize temporal joins for matching samples. For instance, summing two uniformly-sampled signals, written as left.Plus(right), when they share the same sampling period and offset is represented in one specific implementation as:

$$\text{left.Join(right},(l,r)=>l+r); \quad (42)$$

In some instances, when the following conditions are unmet, binary operators preprocess one of the operands before joining them together: 1) if the sampling periods are the same but offsets are different, one signal can be shifted by the offset difference; 2) if the sampling periods are different, the signal with a larger sampling period can be resampled to match the period and offset of the other signal; and 3) when one operand is a non-uniform signal, that signal non-uniform signal can be sampled with the sampling period and offset of the other uniform operand in order to produce a uniform result.

Another example of uniform signal operations are uniform-signal aggregates that combine existing stream operators. For instance, summing samples of a uniform signal s using a hopping window of size W and hop size H samples, written as s.Sum(W,H), can be implemented as:

$$s.\text{HoppingWindow}(W*s.\text{Period}, H*s.\text{Period}, s.\text{Offset}) \quad (43)$$

$$.\text{Aggregate}(w => w.\text{Sum}(e => e)) \quad (44)$$

$$.\text{AlterEventDuration}(1) \quad (45)$$

In the example above, the HoppingWindow macro creates hopping windows by changing event lifetimes, the Sum aggregate adds values together, and the AlterEventDuration operator restores the uniform-signal form by emitting point events.

Figure 5A:
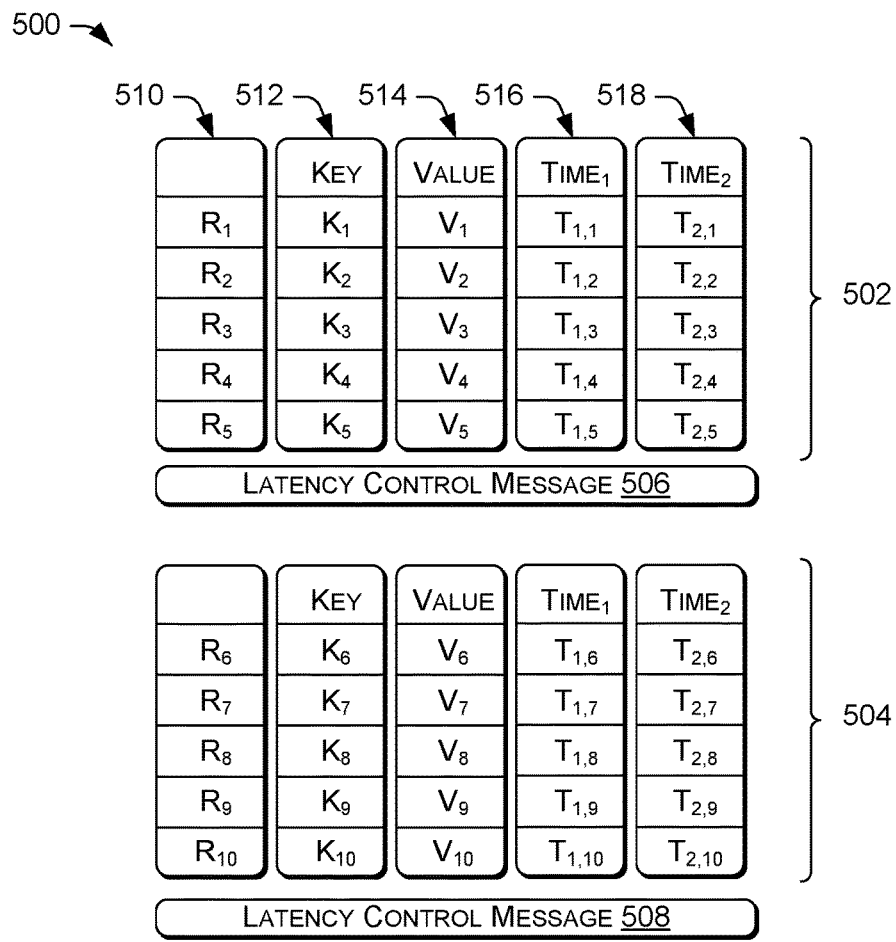
FIG. 5A is a block diagram illustrating an example of data organization within a data batch message that includes multiple columnar payloads.

FIG. 5A is a block diagram 500 illustrating an example of data organization within data batches 502 and 504 that include multiple columnar payloads. Further, the data batches 502 and 504 can be separated by latency control messages 506 and 508, which can control processing of the data batches to output a result at a particular time. For example, the latency control message 506 (also referred to as punctuation) can operate to force the streaming DSP system into flushing partial batches and producing output immediately.

In some instances, the data batch 502 includes multiple columnar payloads illustrated as arrays 510, 512, 514, 516, and 518. In some instances, the arrays 510, 512, 514, 516, and 518 can be individually stored as a physically contiguous array in memory to facilitate efficient memory access. In some instances, a compiler can insert padding between fields in the array to align one or more blocks of data with word boundaries in memory. In some instances, the arrays can be implemented as individual structs in the C or C# programming language. The arrays 510, 512, 514, 516, and 518 can contain any keys, values, and/or times associated with streaming data and/or associated with grouping data into the batched columnar representation. For example, the arrays can contain one or more grouping keys (e.g., a key identifying a particular group within an overall stream), sync time (e.g., a logical instant at which information becomes known to the streaming DSP system), other time (e.g., additional time information, such as an interval of time indicating when the streaming data will apply), keys (e.g., such as sensor ID), values (e.g., temperature, pressure, humidity, functional payloads, real values, complex values, etc.), hashes (e.g., associated with the grouping key), bit vectors (e.g., a single bit indicating whether data is present, etc.), and others.

In some instances, the data batch 504 can include a similar representation of data as the data batch 502. That is, the data batch 504 can include one or more same information categories as the data batch 502 but can be associated with a different grouping key or a different time period or interval.

In some instances, the array 512 can include keys $K_1$, $K_2$, $K_3$, $K_4$, and $K_5$, which can correspond to key values to group and/or identify data. For example, a key value may be used to correspond to a particular sensor ID, such that all data associated with a particular sensor ID may be associated with a particular key value. In some instances, key values do not need to be unique, and one particular key value (e.g., $K_1$) may be associated with a plurality of rows (e.g., $R_1$, $R_2$, $R_5$, $R_7$, etc.).

In some instances, the array 514 can include values $V_1$, $V_2$, $V_3$, $V_4$, and $V_5$, which can correspond to an aggregated and uniform signal processed in accordance with this disclosure.

Figure 5B:
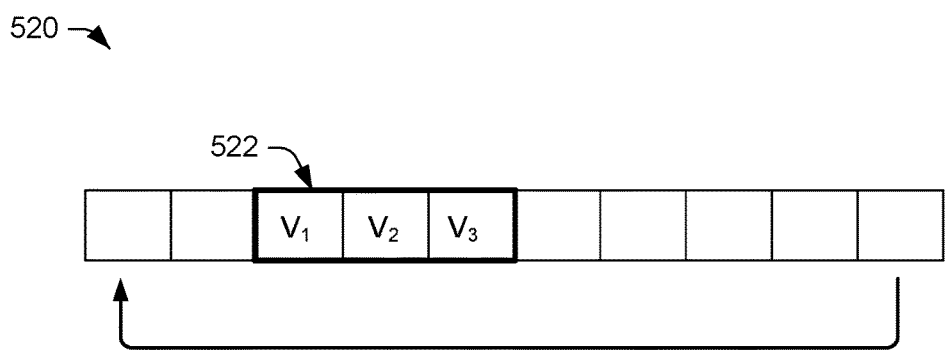
FIG. 5B is a block diagram illustrating an exemplary circular buffer receiving data from an array in a batched columnar representation.

FIG. 5B is a block diagram illustrating an exemplary circular buffer 520 receiving data from an array in a batched columnar representation. For example, the circular buffer 520 can include values $V_1$, $V_2$, and $V_3$, which can correspond to the values $V_1$, $V_2$, and $V_3$ in the array 514 in FIG. 5A. In some instances, the values $V_1$, $V_2$, and $V_3$ can correspond to data within a data window 522 within the circular buffer 520. Data can be copied from the data array 514 to the circular buffer 520 in accordance with a window size associated with the data window 522. A size of the circular buffer 520 can be set according to the size of the data window 522, for example, such that the circular buffer 520 is larger than the data window 522. In some instances, the circular buffer 520 can be associated with a particular key (e.g., sensor ID), such that values associated with the key may be added to the circular buffer 520.

Figure 6:
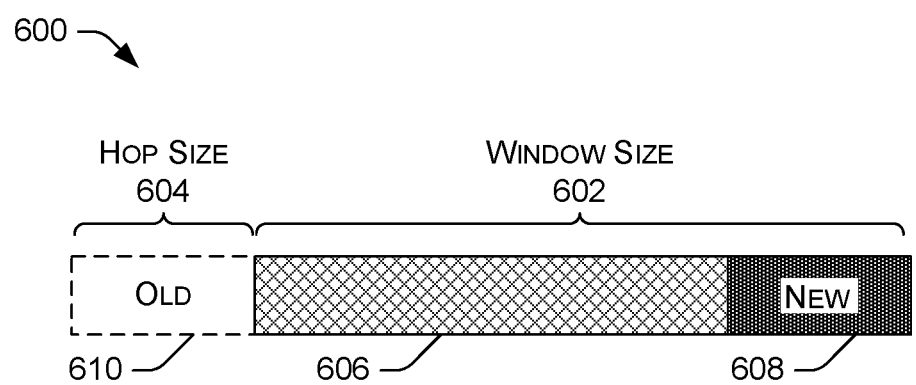
FIG. 6 is a block diagram illustrating an example of window size and hop size for performing DSP operations.

FIG. 6 is a block diagram 600 illustrating an example of a window size 602 and a hop size 604 for performing DSP operations. In processing uniform signals using windows of data (e.g., data 606 and 608 corresponding to the window size 602, or data 610 and 606 corresponding to the window size 602), a signal window (e.g., the data window 522 of FIG. 5B) maintains an array of active samples of one uniform signal. The signal window uses the sampling period and offset of the associated signal to compute the index position of a new sample. In some instances, the signal window also maintains the latest timestamp in the array and can detect any missing value when adding a new sample. In some instances, one or more missing values are either replaced with zeros or marked as invalid. Each signal window is implemented as a fixed size circular array in order to efficiently support offline and online processing with overlapping windows of data.

In one particular implementation, a class called TWindow<T> can be used as a data structure that transforms samples of type T from the tempo-relational data model into the array data model.

Further, signal windows support incremental computation over hopping windows (e.g., in accordance with the hop size 604). Each signal window can maintain a fixed-size history of recently expired samples, such as the hop size 604. The TWindow<T> class can provide methods for accessing the whole array of data stored in the circular buffer, the old delta (e.g., as illustrated by the data 610), and the new delta (e.g., as illustrated by the data 608). In some instances, these deltas (e.g., the data 610 and 608) can be used by the DSP operators to incrementally update operator states on every hop event.

In some instances, parameters for a signal windows can be set according to a DSP operation, for example, via an interface such as the interface module 210 of FIG. 2. In some instances, a window specification can comprise three parameters: 1) a window size (e.g., such as the window size 602) indicating how many samples each window lasts or includes; 2) a hop size (e.g., such as the hop size 604) indicating by how many samples each window moves forward relative to the previous one; and 3) a Boolean indicator indicating how to handle missing samples. For example, if the Boolean indicator is true, missing samples can be replaced with zeros in the circular buffer when copied from an array, if false, the missing samples can be marked as invalid. In some instances, the Boolean indicator is based on a type of DSP operation to be performed. For instance, an FFT operation can mark missing samples as invalid while a digital filtering operation can use the Boolean operator to pad the array with zeros in the circular buffer.

The example processes (e.g., in FIGS. 1 and 7) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 7:
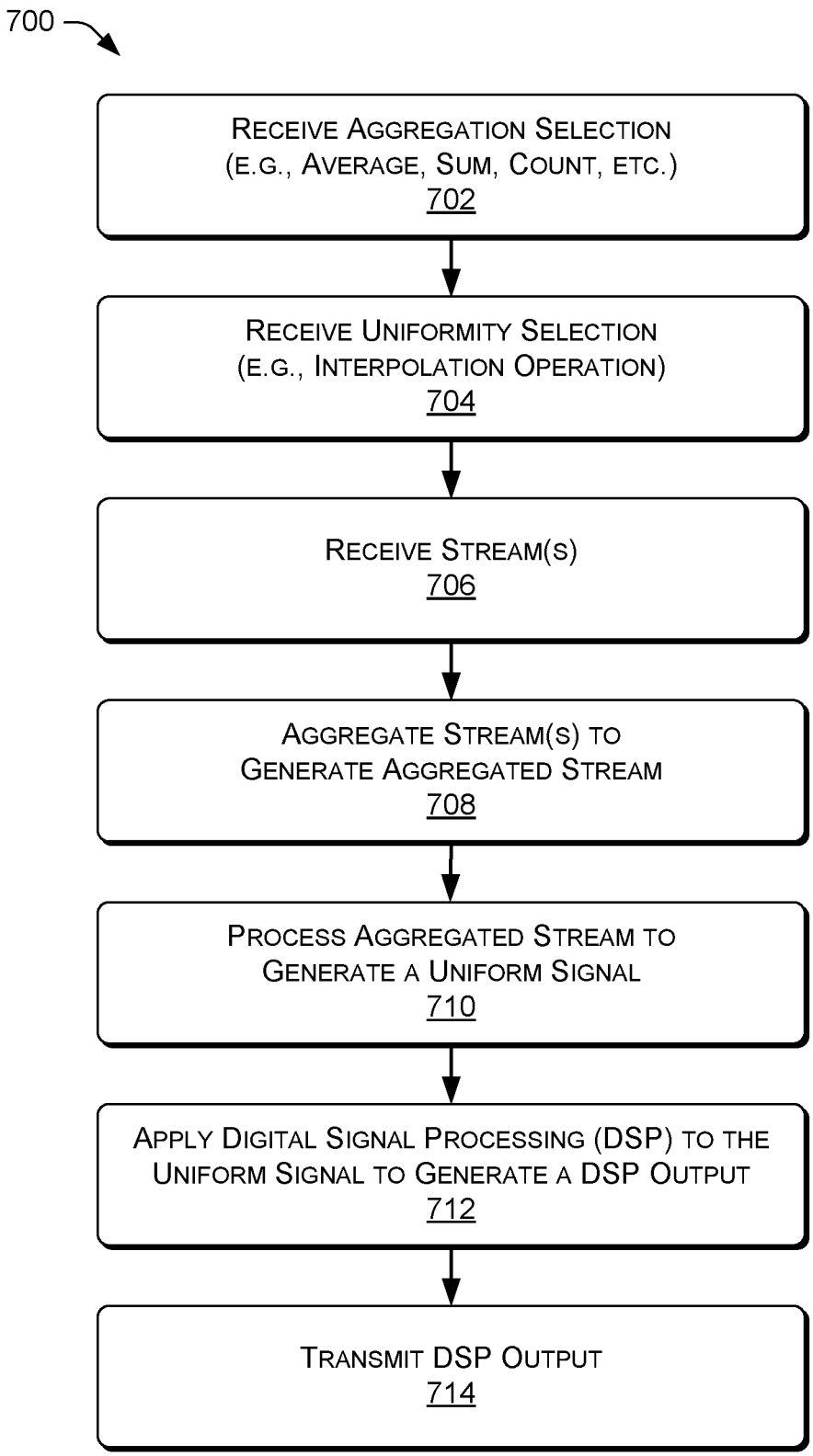
FIG. 7 is a process for configuring DSP operations and applying DSP operations to streaming data.

FIG. 7 is a process 700 for configuring DSP operations and applying DSP operations to streaming data. In one embodiment, the process 700 can be performed by the service provider 216 and/or the computing device 202 of FIG. 2. However, processes can be performed in other environments and by other devices as well.

At 702, the operation can include receiving an aggregation selection indicating which aggregation function to use on streaming data. For example, an aggregation selection can include selecting an average function, a sum function, a count function, etc. In some instances, an aggregation selection can be input via the interface module 210 and received via the service provider 216.

At 704, the operation can include receiving a uniformity selection indicating which uniform processing function to use on streaming data. For example, a uniformity selection can include selecting one or more sampling functions and/or interpolation functions to replace missing data. In some instances, a uniformity selection can be input via the interface module 210 and received via the service provider 216.

At 706, the operation can include receiving one or more streams of data. For example, tens, hundreds, thousands, millions, or more streams can be receive via one or more computing devices (such as the computing device 202) or one or more sensors (such as the sensors 214). For example, in the case of receiving streams of temperature readings from different sensors in time order, each reading can have the format of <SensorID, Time, Value>.

At 708, the operation includes aggregating streams to generate an aggregated stream. For example, this operation 708 can ensure that at most one stream event is active at any point in time. This aggregation operation 708 can be based on the aggregation selection received in the operation 702.

At 710, the operation can include processing the aggregated stream to generate a uniform signal. For example, the processing in the operation 710 can include sampling and interpolating the streaming data, and/or evaluating a functional payload to materialize values at discrete time intervals.

At 712, the operation can include applying digital signal processing (DSP) to the uniform signals to generate a DSP output. In some instances, the operation 712 may include incremental processing while maintaining a state of the DSP operation during hop events.

At 714, the operation can include transmitting the DSP output for presentation to a user and/or as an input to another function in a processing workflow.

Figure 8:
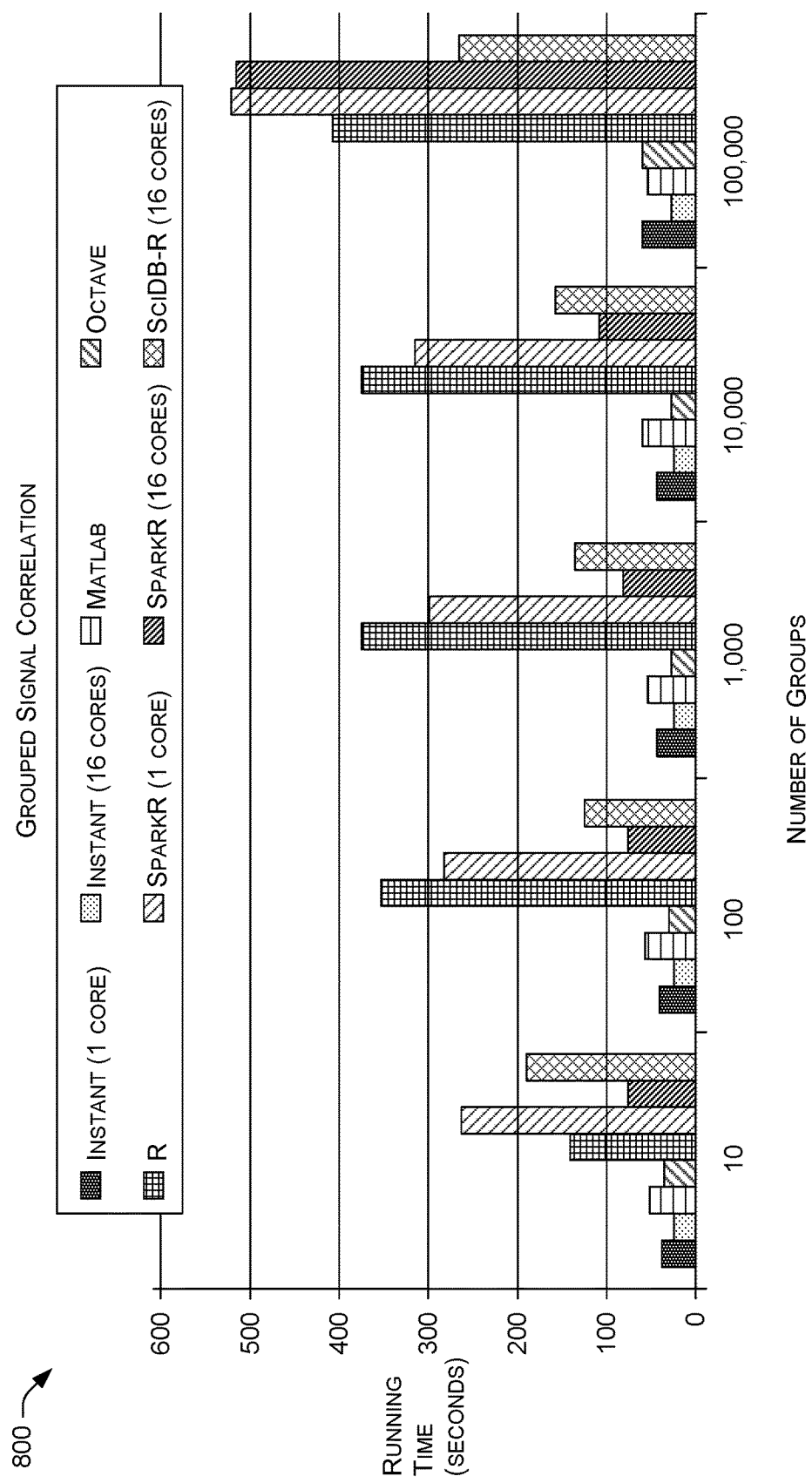
FIG. 8 illustrates an example diagram comparing performances of the exemplary techniques and/or systems to conventional DSP systems based on grouped signal correlation.
Figure 9:
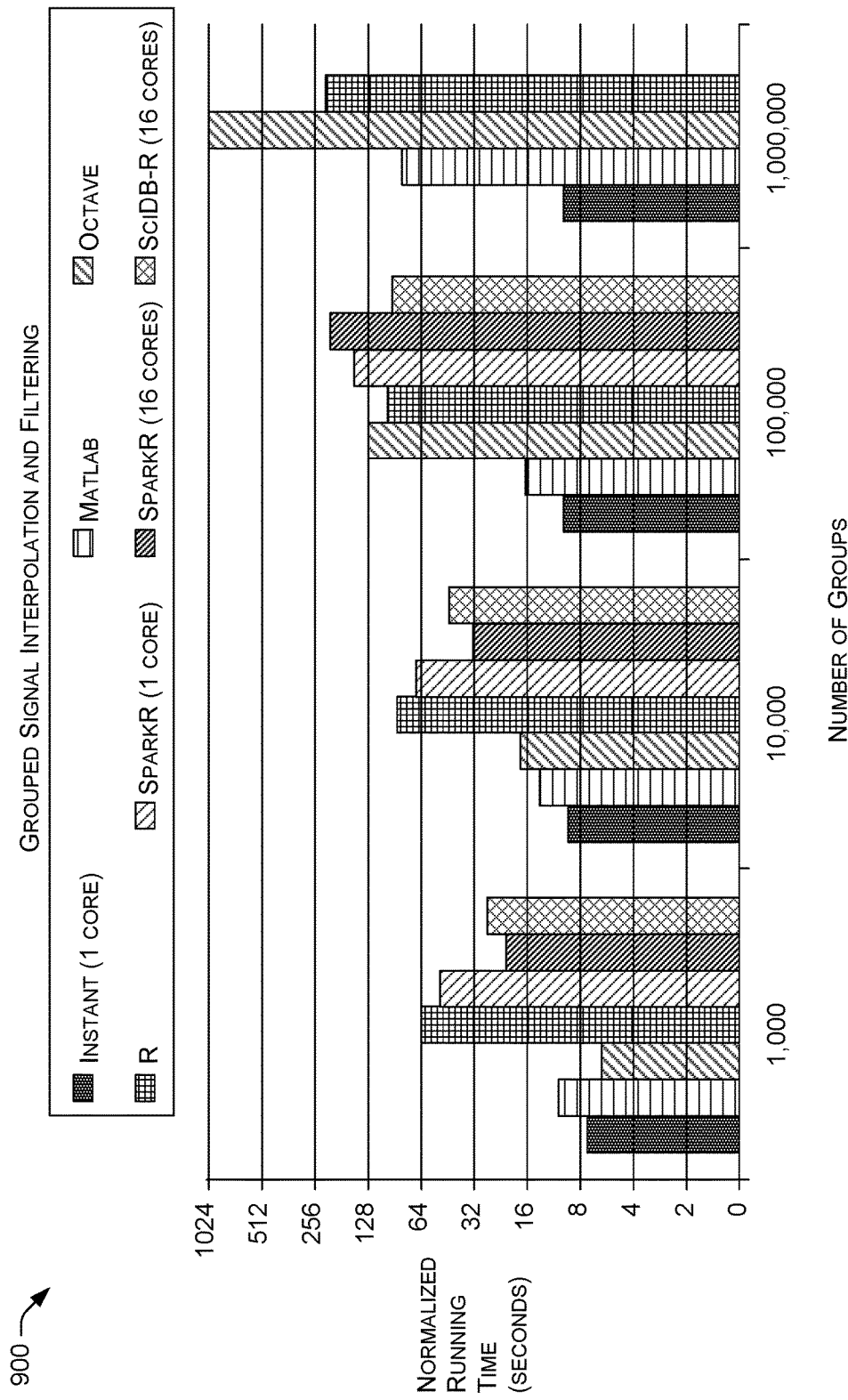
FIG. 9 illustrates an example diagram comparing performances of the exemplary techniques and/or systems to conventional DSP systems based on grouped signal interpolation and filtering.
Figure 10:
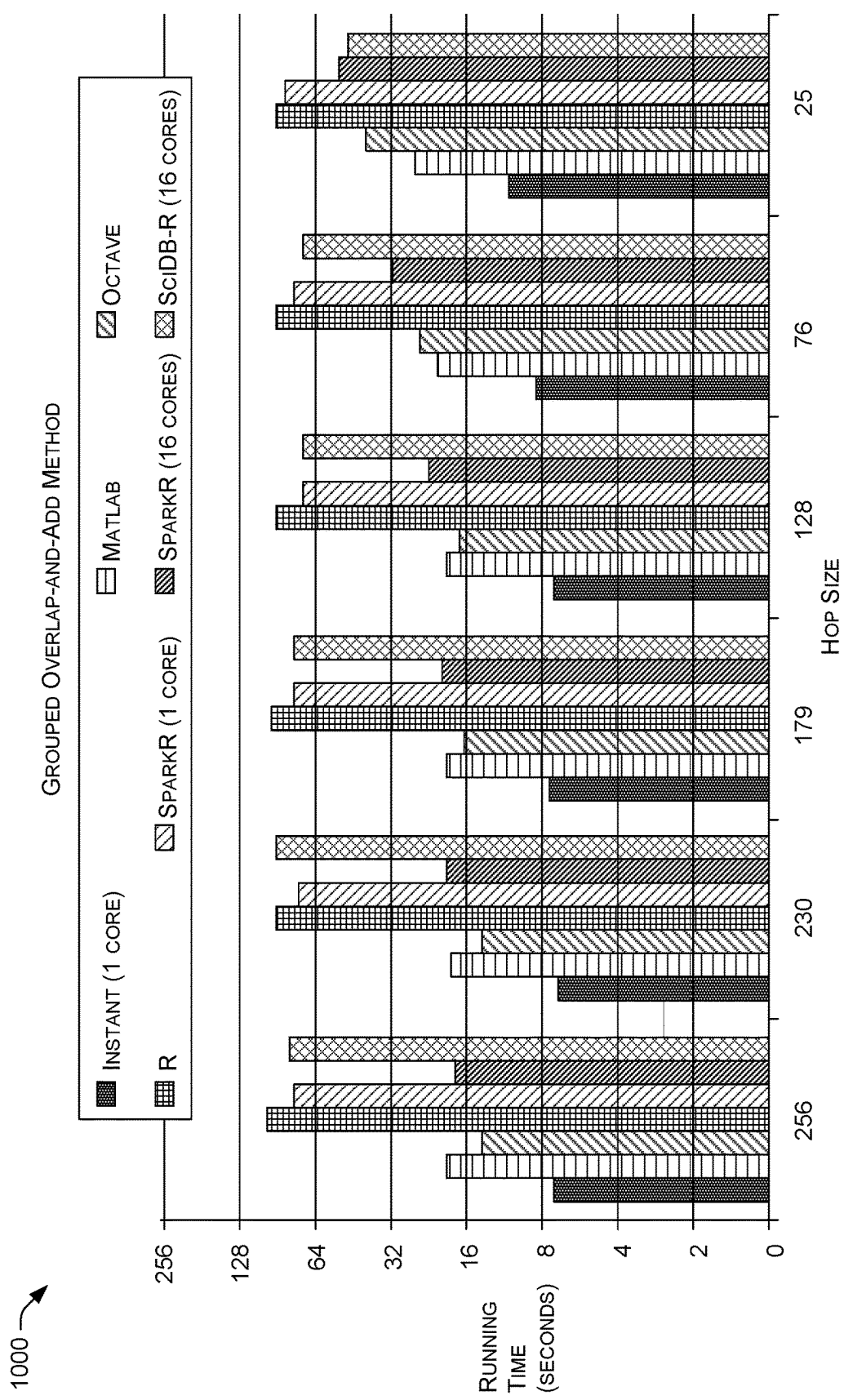
FIG. 10 illustrates an example diagram comparing performances of the exemplary techniques and/or systems to conventional DSP systems based on a grouped overlap-and-add method.

FIGS. 8-10 illustrate exemplary performances involving grouped computations over streams of temperature readings having the format of <SensorID, Time, Value>. The exemplary performances include executing different sub-queries for each group identified by the grouping key (SensorId). Three different sub-queries of growing complexity are considered in FIGS. 8-10 that combine signal processing and relational operations, while varying the number of groups while keeping the input signal size fixed. These exemplary performances illustrate the improvements to the computer provided by the exemplary streaming DSP system.

FIG. 8 illustrates an example diagram 800 comparing performances of the exemplary techniques and/or systems to conventional DSP systems based on grouped signal correlation.

The example illustrated in FIG. 8 attempts to correlate a given vector of values of size 32, denoted as a, with a uniform signal of each group identified by SensorId. The correlation operation is a sliding window (i.e., the hop size is 1) computation that evaluates a dot product between the window and vector a at every sample point. In one particular implementation, the query can be expressed as follows:

$$\text{var query3}= \qquad (46)$$

$$s0.\text{Map}(s => s.\text{Select}(e => e.\text{Temp}), e => e.\text{SensorId}) \qquad (47)$$

$$.\text{Reduce}(s => s.\text{Correlation}(a), \qquad (48)$$

$$(k,p) => \text{new Result} \{\text{SensorId}=k, \text{Temp}=p\}) \qquad (49)$$

In the particular implementation expressed above, the Map operation selects the value column and tags each stream event with its group identifier (SensorId), while the Reduce operation executes the sub-query on each group. In some instances, the streaming DSP system supports parallel execution of sub-queries using a specified level of parallelism. These exemplary performances illustrate performance of the streaming DSP system utilizing 1 core (e.g., Instant (1 core)) and 16 cores (e.g., Instant (16 cores)).

FIG. 8 illustrates the query performance of the exemplary systems with different numbers of groups. In some instances, the streaming DSP system outperforms other exemplary systems by completing the grouped signal correlation up to twenty times faster than other systems.

FIG. 9 illustrates an example diagram 900 comparing performances of the exemplary techniques and/or systems to conventional DSP systems based on grouped signal interpolation and filtering. In this example, two uniformly-sampled signals s1 and s2 consisting of real-valued samples from [0, 1] and having different sampling periods, 20 and 5, respectively, are processed, with performances of the respective systems being compared. For each group, the processing in the streaming DSP system includes upsampling the first signal to match a sampling period of the second, and further includes reporting events at which both group signals have simultaneously extreme values (close to 0 or 1). In one particular implementation, the grouping of the signal s1 can be expressed as before, with the representative instructions repeated below for the signal s2:

$$\text{var } u1 = s1.\text{Map}(s => s.\text{Select}(e => e.\text{Temp}), \qquad (50)$$

$$e => e.\text{SensorId}) \qquad (51)$$

In another particular implementation, the query can be expressed using a two-parameter Reduce operator as follows:

$$\text{var query4} = u1.\text{Reduce}(u2,(1,r)=> \qquad (52)$$

$$1.\text{Sample}(5,0,p=>p.\text{FirstOrder}(20)) \qquad (53)$$

$$.\text{Plus}(r).\text{Where}(e=>e<0.0001\|e>1.9999), \qquad (54)$$

$$(k,p)=>\text{new Result} \{\text{SensorId}=k,\text{Temp}=p\}) \qquad (55)$$

FIG. 9 illustrates the query running times of different systems normalized by the running time of the instant streaming DSP system utilizing 16 cores over varying numbers of groups. That is, the instant streaming DSP system achieves an improved performance of a factor of 8 when run over 16 cores compared to 1 core. Further, FIG. 9 illustrates the y-axis using a log scale. In some instances the streaming DSP system supports stateful interpolation of grouped signals, which results in at least ten times better performance than the other systems, with the performance gap increasing with more groups. In some instances, conventional DSP systems such as SparkR and SciDB-R crash when processing 1,000,000 groups, while Octave has been observed to be three orders of magnitude slower than the streaming DSP system. Thus, FIG. 9 further illustrates the improvements to the computer provided by the instant streaming DSP system.

FIG. 10 illustrates an example diagram 1000 comparing performances of the exemplary techniques and/or systems to conventional DSP systems based on a grouped overlap-and-add method on a uniformly-sampled grouped signal. One particular implementation of the grouped overlap-and-add method is represented as:

$$\text{var query5=} \tag{56}$$

$$s0.\text{Map}(s=>s.\text{Select}(e=>e.\text{Temp}),e=>e.\text{SensorId}) \tag{57}$$

$$.\text{Reduce}(s=>s.\text{Window}(\text{windowSize},\text{hopSize},\text{true}, \tag{58}$$

$$w=>w.\text{FFT}(\ ).\text{Select}(w=>w),\text{InverseFFT}(\ ), \tag{59}$$

$$a=>a.\text{Sum}(\ )), \tag{60}$$

$$(k,p)=>\text{new Result } \{\text{SensorId}=k,\text{Temp}=p\}) \tag{61}$$

FIG. 10 illustrates the overlap-and-add method performance in the benchmarked systems normalized by the performance of the instant streaming DSP system with 16 cores over 256-sample hopping windows with different hop sizes. The exemplary performance illustrates 100 groups in the stream. As with other grouped queries, the instant streaming DSP system outperforms the other exemplary systems by up to two orders of magnitude. In some instances, the improved performance is based at least in part on the use of circular arrays that effectively handle overlapping windows of data, especially when using small hop sizes, and enable in-situ data processing while avoiding redundant data transfers.

EXAMPLE CLAUSES

Example A, at system comprising: one or more processors; and memory storing modules that, when executed by the one or more processors, cause the system to perform operations comprising: receiving streaming data from a plurality of sensors, the streaming data including a first plurality of payloads associated with a first time value and a second plurality of payloads associated with a second time value; applying an aggregation operation to the streaming data to generate aggregated streaming data, the aggregated streaming data including a first single payload associated with the first time value and a second single payload associated with the second time value; applying an interpolation operation to the aggregated streaming data to generate a uniform signal, wherein the uniform signal includes a first interpolated value based on the first single payload and a second interpolated value based on the second single payload, wherein the first interpolated value and the second interpolated value are associated with a uniform sampling period and an offset value; storing the uniform signal in a batched columnar representation in the memory, wherein the batched columnar representation comprises at least a first columnar array and a second columnar array, the first columnar array comprising a plurality of data fields stored in physical proximity in the memory, a first data field of the plurality of data fields storing the first interpolated value and a second data field of the plurality of data fields storing the second interpolated value, the second columnar array comprising at least a first array of grouping keys associated with a first data batch and a second array of grouping keys associated with a second data batch; accessing, from the batched columnar representation stored in the memory, the first columnar array, the accessing performed without accessing the second columnar array; storing at least the first data field and the second data field in a circular buffer in accordance with a data window, the data window associated with a digital signal processing (DSP) operation selected from the group comprising a Fast Fourier Transform, a convolution, a Finite Impulse Response, and an Infinite Impulse Response; and applying the DSP operation to the first data field and the second data field stored in the circular buffer to generate a first DSP output.

Example B, the system of Example A, wherein: the streaming data further includes a third plurality of payloads associated with a third time value; the aggregated streaming data further includes a third single payload associated with the third time value; the uniform signal further includes a third interpolated value based on the third single payload, and wherein the third interpolated value is associated with the uniform sampling period and the offset value; and the first columnar array further stores the third interpolated value in a third data field of the plurality of data fields; and wherein the operations further comprise: determining that the DSP operation has processed the first data field and the second data field associated with the data window; storing at least the third field value in the circular buffer in accordance with an incremental data window associated with the DSP operation; applying the DSP operation to the third data field stored in the circular buffer to generate a second DSP output; and determining an updated DSP output based at least in part on the first DSP output and the second DSP output.

Example C, the system of Example A or Example B, wherein the accessing the first columnar array without accessing the second columnar array improves a functioning of the system by reducing a memory usage and a processing time of the system.

Example D, the system of any one of Example A through Example C, wherein the first single payload includes a functional payload, and wherein generating the uniform signal includes at least evaluating the functional payload at the first time value to generate the first interpolated value.

Example E, the system of any one of Example A through Example D, wherein the operations further comprise processing a plurality of data batches stored in the batched columnar representation, the processing including inserting a latency control message between the first data batch of the plurality of data batches and the second data batch of the plurality of data batches, the latency control message to initiate a completion of the processing of the first data batch.

While Example A through Example E are described above with respect to a system, it is understood in the context of this document that the content of Example A through Example E may also be implemented via a device, computer storage media, and/or a method.

Example F, a computer-implemented method comprising: receiving streaming data from one or more sensors; applying an aggregation operation to the streaming data to generate aggregated streaming data; applying a uniformity operation to the aggregated streaming data to generate a uniform signal; storing the uniform signal in a batched columnar representation in a memory; accessing, from the batched columnar representation stored in the memory, a columnar array including a plurality of field values; storing a portion of the plurality of the field values in a circular buffer in accordance with a data window, the data window associated with a digital signal processing (DSP) operation; and applying the DSP operation to the portion of the plurality of the field values stored in the circular buffer to generate a DSP output.

Example G, the computer-implemented method of Example F, wherein the portion of the plurality of the field values is a first portion, and wherein the DSP output is a first DSP output, the computer-implemented method further comprising: storing a second portion of the plurality of the field values in the circular buffer in accordance with an incremental data window size; applying the DSP operation to the second portion of the plurality of the field values to generate a second DSP output; and generating an updated DSP output based at least in part on the first DSP output and the second DSP output.

Example H, the computer-implemented method of Example F or Example G, further comprising maintaining a state of the DSP operation between generating the first DSP output and generating the second DSP output.

Example I, the computer-implemented method of any one of Example F through Example H, the uniformity operation including at least a sampling operation to generate a plurality of values at time values associated with a uniform sampling period.

Example J, the computer-implemented method of any one of Example F through Example I, the uniformity operation including at least an interpolation operation to generate at least one interpolated value at a time value associated with a uniform sampling period.

Example K, the computer-implemented method of any one of Example F through Example J, wherein storing the uniform signal in the batched columnar representation in the memory comprises generating at least a first batch and a second batch, the first batch associated with a first array of grouping keys based in part on a first time interval, and the second batch associated with a second array of grouping keys based in part on a second time interval.

Example L, the computer-implemented method of any one of Example F through Example K, wherein the streaming data includes a first functional payload associated with a first time interval and a second functional payload associated with a second time interval, the computer-implemented method further comprising: evaluating the first functional payload at a first time point to generate a first materialized value; and evaluating the second functional payload at a second time point to generate a second materialized value, wherein the uniform signal includes the first materialized value and the second materialized value.

Example M, the computer-implemented method of any one of Example F through Example L, further comprising selecting, as the DSP operation, at least one of a Fast Fourier Transform, a convolution, a Finite Impulse Response, an Infinite Impulse Response, and a digital filter.

Example N the computer-implemented method of any one of Example F through Example M, wherein applying the aggregation operation to the streaming data to generate the aggregated streaming data includes grouping streaming data from at least a first sensor and a second sensor of the one or more sensors.

Example O, the computer-implemented method of any one of Example F through Example N, wherein each value of the plurality of field values is written to the circular buffer once in association with applying the DSP operation.

While Example F through Example O are described above with respect to a method, it is understood in the context of this document that the content of Example F through Example O may also be implemented via a device, system, and/or computer storage media.

Example P, a system comprising: one or more processors; and memory storing modules that, when executed by the one or more processors, cause the system to perform operations comprising: receiving streaming data from one or more sensors; applying an aggregation operation to the streaming data to generate aggregated streaming data; applying a uniformity operation to the aggregated streaming data to generate a uniform signal; storing the uniform signal in a batched columnar representation in a memory; accessing, from the batched columnar representation stored in the memory, a columnar array including a plurality of field values; storing a portion of the plurality of the field values in a circular buffer in accordance with a data window, the data window associated with a digital signal processing (DSP) operation; and applying the DSP operation to the portion of the plurality of the field values stored in the circular buffer to generate a DSP output.

Example Q, the system of Example P, wherein the portion of the plurality of the field values is a first portion, and wherein the DSP output is a first DSP output, the operations further comprising: storing a second portion of the plurality of the field values in the circular buffer in accordance with an incremental data window size; applying the DSP operation to the second portion of the plurality of the field values to generate a second DSP output; and generating an updated DSP output based at least in part on the first DSP output and the second DSP output.

Example R, the system of Example P or Example Q, wherein storing the uniform signal in the batched columnar representation in the memory comprises generating at least a first batch and a second batch, the first batch associated with a first array of grouping keys based in part on a first time interval, and the second batch associated with a second array of grouping keys based in part on a second time interval.

Example S, the system of any one of Example P through Example R, wherein the streaming data includes a first functional payload associated with a first time interval and a second functional payload associated with a second time interval, the computer-implemented method further comprising: evaluating the first functional payload at a first time point to generate a first materialized value; and evaluating the second functional payload at a second time point to generate a second materialized value, wherein the uniform signal includes the first materialized value and the second materialized value.

Example T, the system of any one of Example P through Example S, wherein applying the aggregation operation to the streaming data to generate the aggregated streaming data includes grouping streaming data from at least a first sensor and a second sensor of the one or more sensors.

While Example P through Example T are described above with respect to a system, it is understood in the context of this document that the content of Example P through Example T may also be implemented via a device, computer storage media, and/or a method.

CONCLUSION

Although the present disclosure can use language that is specific to structural features and/or methodological operations, the disclosure is not limited to the specific features or operations described herein. Rather, the specific features and operations are disclosed as illustrative forms of implementing the disclosure.

What is claimed is:

1. A computer-implemented method comprising:
receiving streaming data from one or more sensors, wherein the streaming data includes a first functional payload associated with a first time interval and a second functional payload associated with a second time interval;
applying an aggregation operation to the streaming data to generate aggregated streaming data;
applying a uniformity operation to the aggregated streaming data to generate a uniform signal, wherein applying the uniformity operation comprises:
generating a first materialized value based on the first functional payload; and
generating a second materialized value based on the second functional payload;
storing the uniform signal in a batched columnar representation in a memory, wherein the uniform signal includes the first materialized value and the second materialized value;
accessing, from the batched columnar representation stored in the memory, a columnar array including a plurality of field values;
storing a portion of the plurality of the field values in a circular buffer in accordance with a data window, the data window associated with a digital signal processing (DSP) operation; and
applying the DSP operation to the portion of the plurality of the field values stored in the circular buffer to generate a DSP output.

2. The computer-implemented method of claim 1, wherein the portion of the plurality of the field values is a first portion, and wherein the DSP output is a first DSP output, the computer-implemented method further comprising:
storing a second portion of the plurality of the field values in the circular buffer in accordance with an incremental data window size;
applying the DSP operation to the second portion of the plurality of the field values to generate a second DSP output; and
generating an updated DSP output based at least in part on the first DSP output and the second DSP output.

3. The computer-implemented method of claim 2, further comprising maintaining a state of the DSP operation between generating the first DSP output and generating the second DSP output.

4. The computer-implemented method of claim 1, the uniformity operation including at least a sampling operation to generate a plurality of values at time values associated with a uniform sampling period.

5. The computer-implemented method of claim 1, the uniformity operation including at least an interpolation operation to generate at least one interpolated value at a time value associated with a uniform sampling period.

6. The computer-implemented method of claim 1, wherein storing the uniform signal in the batched columnar representation in the memory comprises generating at least a first batch and a second batch, the first batch associated with a first array of grouping keys based in part on a first time interval, and the second batch associated with a second array of grouping keys based in part on a second time interval.

7. The computer-implemented method of claim 1, further comprising selecting, as the DSP operation, at least one of a Fast Fourier Transform, a convolution, a Finite Impulse Response, an Infinite Impulse Response, and a digital filter.

8. The computer-implemented method of claim 1, wherein applying the aggregation operation to the streaming data to generate the aggregated streaming data includes grouping streaming data from at least a first sensor and a second sensor of the one or more sensors.

9. The computer-implemented method of claim 1, wherein each value of the plurality of field values is written to the circular buffer once in association with applying the DSP operation.

10. The computer-implemented method of claim 1, wherein the aggregation function comprises adding the first functional payload with a third functional payload, wherein a lambda function expresses the addition.

11. The computer-implemented method of claim 1, wherein generating the first materialized value based on the first functional payload comprises evaluating an identity function.

12. A system comprising:
one or more processors; and
memory storing modules that, when executed by the one or more processors, cause the system to perform operations comprising:
receiving streaming data from one or more sensors, wherein the streaming data includes a first functional payload associated with a first time interval and a second functional payload associated with a second time interval;
applying an aggregation operation to the streaming data to generate aggregated streaming data;
applying a uniformity operation to the aggregated streaming data to generate a uniform signal, wherein applying the uniformity operation comprises:
generating a first materialized value based on the first functional payload; and
generating a second materialized value based on the second functional payload;
storing the uniform signal in a batched columnar representation in a memory, wherein the uniform signal includes the first materialized value and the second materialized value;
accessing, from the batched columnar representation stored m the memory, a columnar array including a plurality of field values;
storing a portion of the plurality of the field values in a circular buffer in accordance with a data window, the data window associated with a digital signal processing (DSP) operation; and
applying the DSP operation to the portion of the plurality of the field values stored in the circular buffer to generate a DSP output.

13. The system as recited in claim 12, wherein the portion of the plurality of the field values is a first portion, and wherein the DSP output is a first DSP output, the operations further comprising:
storing a second portion of the plurality of the field values in the circular buffer in accordance with an incremental data window size;
applying the DSP operation to the second portion of the plurality of the field values to generate a second DSP output; and
generating an updated DSP output based at least in part on the first DSP output and the second DSP output.

14. The system as recited in claim 12, wherein storing the uniform signal in the batched columnar representation in the memory comprises generating at least a first batch and a second batch, the first batch associated with a first array of grouping keys based in part on a first time interval, and the second batch associated with a second array of grouping keys based in part on a second time interval.

15. The system as recited in claim 12, wherein applying the aggregation operation to the streaming data to generate the aggregated streaming data includes grouping streaming data from at least a first sensor and a second sensor of the one or more sensors.

16. A system comprising:
one or more processors; and
memory storing modules that, when executed by the one or more processors, cause the system to perform operations comprising:
receiving streaming data from a plurality of sensors, the streaming data including a first plurality of payloads associated with a first time value and a second plurality of payloads associated with a second time value;
applying an aggregation operation to the streaming data to generate aggregated streaming data, the aggregated streaming data including a first single payload associated with the first time value and a second single payload associated with the second time value;
applying an interpolation operation to the aggregated streaming data to generate a uniform signal, wherein the uniform signal includes a first interpolated value based on the first single payload and a second interpolated value based on the second single payload, wherein the first interpolated value and the second interpolated value are associated with a uniform sampling period and an offset value;
storing the uniform signal in a batched columnar representation in the memory, wherein the batched columnar representation comprises at least a first columnar array and a second columnar array, the first columnar array comprising a plurality of data fields stored in the memory, a first data field of the plurality of data fields storing the first interpolated value and a second data field of the plurality of data fields storing the second interpolated value, the second columnar array comprising at least a first array of grouping keys associated with a first data batch and a second array of grouping keys associated with a second data batch;
accessing, from the batched columnar representation stored in the memory, the first columnar array, the accessing performed without accessing the second columnar array;
storing at least the first data field and the second data field in a circular buffer in accordance with a data window, the data window associated with a digital signal processing (DSP) operation; and
applying the DSP operation to the first data field and the second data field stored in the circular buffer to generate a first DSP output.

17. The system of claim 16, wherein:
the streaming data further includes a third plurality of payloads associated with a third time value;
the aggregated streaming data further includes a third single payload associated with the third time value;
the uniform signal further includes a third interpolated value based on the third single payload, and wherein the third interpolated value is associated with the uniform sampling period and the offset value; and
the first columnar array further stores the third interpolated value in a third data field of the plurality of data fields; and
wherein the operations further comprise:
determining that the DSP operation has processed the first data field and the second data field associated with the data window;
storing at least the third field value in the circular buffer in accordance with an incremental data window associated with the DSP operation;
applying the DSP operation to the third data field stored in the circular buffer to generate a second DSP output; and
determining an updated DSP output based at least in part on the first DSP output and the second DSP output.

18. The system of claim 16, wherein the accessing the first columnar array without accessing the second columnar array improves a functioning of the system by reducing a memory usage and a processing time of the system.

19. The system of claim 16, wherein the first single payload includes a functional payload, and wherein generating the uniform signal includes at least evaluating the functional payload at the first time value to generate the first interpolated value.

20. The system of claim 16, wherein the operations further comprise processing a plurality of data batches stored in the batched columnar representation, the processing including inserting a latency control message between the first data batch of the plurality of data batches and the second data batch of the plurality of data batches, the latency control message to initiate a completion of the processing of the first data batch.

* * * * *